(12) United States Patent
Hata et al.

(10) Patent No.: US 11,437,739 B2
(45) Date of Patent: Sep. 6, 2022

(54) CONNECTOR PRE-FILLED WITH SEALANT

(71) Applicant: KYOCERA CORPORATION, Kyoto (JP)

(72) Inventors: Tetsuya Hata, Yokohama (JP); Shigeki Ohara, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/955,543

(22) PCT Filed: Dec. 4, 2018

(86) PCT No.: PCT/JP2018/044623
§ 371 (c)(1),
(2) Date: Jun. 18, 2020

(87) PCT Pub. No.: WO2019/124064
PCT Pub. Date: Jun. 27, 2019

(65) Prior Publication Data
US 2021/0098899 A1  Apr. 1, 2021

(30) Foreign Application Priority Data
Dec. 22, 2017 (JP) .............................. JP2017-246961

(51) Int. Cl.
*H01R 13/52* (2006.01)
*H01R 4/2456* (2018.01)
*H01R 4/70* (2006.01)

(52) U.S. Cl.
CPC ............. *H01R 4/2456* (2018.01); *H01R 4/70* (2013.01); *H01R 13/5208* (2013.01); *H01R 13/5216* (2013.01)

(58) Field of Classification Search
CPC ...... H01R 4/2456; H01R 4/70; H01R 4/2433; H01R 4/2454–13/5208; H01R 13/5216; H01R 13/501; H01R 13/521
See application file for complete search history.

(56) References Cited

U.S. PATENT DOCUMENTS

| 5,147,217 | A | 9/1992 | Neale, III | |
|---|---|---|---|---|
| 6,854,996 | B2 * | 2/2005 | Yaworski | H01R 4/36 439/276 |
| 7,445,481 | B2 | 11/2008 | Nagashima et al. | |
| 7,507,126 | B2 * | 3/2009 | King, Jr. | B41J 2/1404 439/521 |

(Continued)

FOREIGN PATENT DOCUMENTS

| DE | 10142363 A1 | 3/2003 |
|---|---|---|
| EP | 0164800 A1 | 12/1985 |
| JP | 2004327174 A | 11/2004 |

(Continued)

*Primary Examiner* — Vanessa Girardi
(74) *Attorney, Agent, or Firm* — Duane Morris LLP

(57) ABSTRACT

A connector (10) configured to bring an object (70) into conduction comprises: a pair of fitting bodies fittable to each other; and a filler (60) with which at least one fitting body of the pair of fitting bodies is loaded, wherein a fitting body of the pair of fitting bodies includes: an accommodating portion (35a) configured to accommodate the object (70) together with the filler (60); and a receiving portion (36) configured to be adjacent to the accommodating portion (35a) and receive the filler (60).

7 Claims, 16 Drawing Sheets

(56) References Cited

U.S. PATENT DOCUMENTS

2005/0003708 A1     1/2005   Fukuda
2007/0117440 A1     5/2007   Nagashima et al.

FOREIGN PATENT DOCUMENTS

| | | |
|---|---|---|
| JP | 2005251400 A | 9/2005 |
| JP | 2006012744 A | 1/2006 |
| JP | 4565337 B2 | 8/2010 |
| JP | 2011134606 A | 7/2011 |
| JP | 2014116097 A | 6/2014 |

\* cited by examiner

CONNECTOR PRE-FILLED WITH SEALANT

CROSS REFERENCE TO RELATED APPLICATION

This application claims priority to and the benefit of Japanese Patent Application No. 2017-246961 filed on Dec. 22, 2017, the entire disclosure of which is incorporated herein by reference.

TECHNICAL FIELD

The present disclosure relates to a connector.

BACKGROUND

A connector which holds a plurality of objects by a pair of fitting bodies fitted to each other so that the plurality of objects are electrically connected to each other via a relay contact inside the fitting bodies is conventionally known. For such a connector, there is a known technique that protects the connection portion between each object and the relay contact to prevent external foreign matter such as water and dust from entering the connection portion, in a state in which the fitting bodies are fitted to each other.

For example, PTL 1 discloses a branch connector that can effectively prevent external foreign matter from entering the relay contact side by arranging a main packing and a sub packing inside the fitting bodies.

CITATION LIST

Patent Literature

PTL 1: JP 2014-116097 A

SUMMARY

A connector according to an embodiment of the present disclosure is a connector configured to bring an object into conduction, comprising: a pair of fitting bodies fittable to each other; and a filler with which at least one fitting body of the pair of fitting bodies is loaded, wherein a fitting body of the pair of fitting bodies includes: an accommodating portion configured to accommodate the object together with the filler; and a receiving portion configured to be adjacent to the accommodating portion and receive the filler.

DETAILED DESCRIPTION

Figure 1:
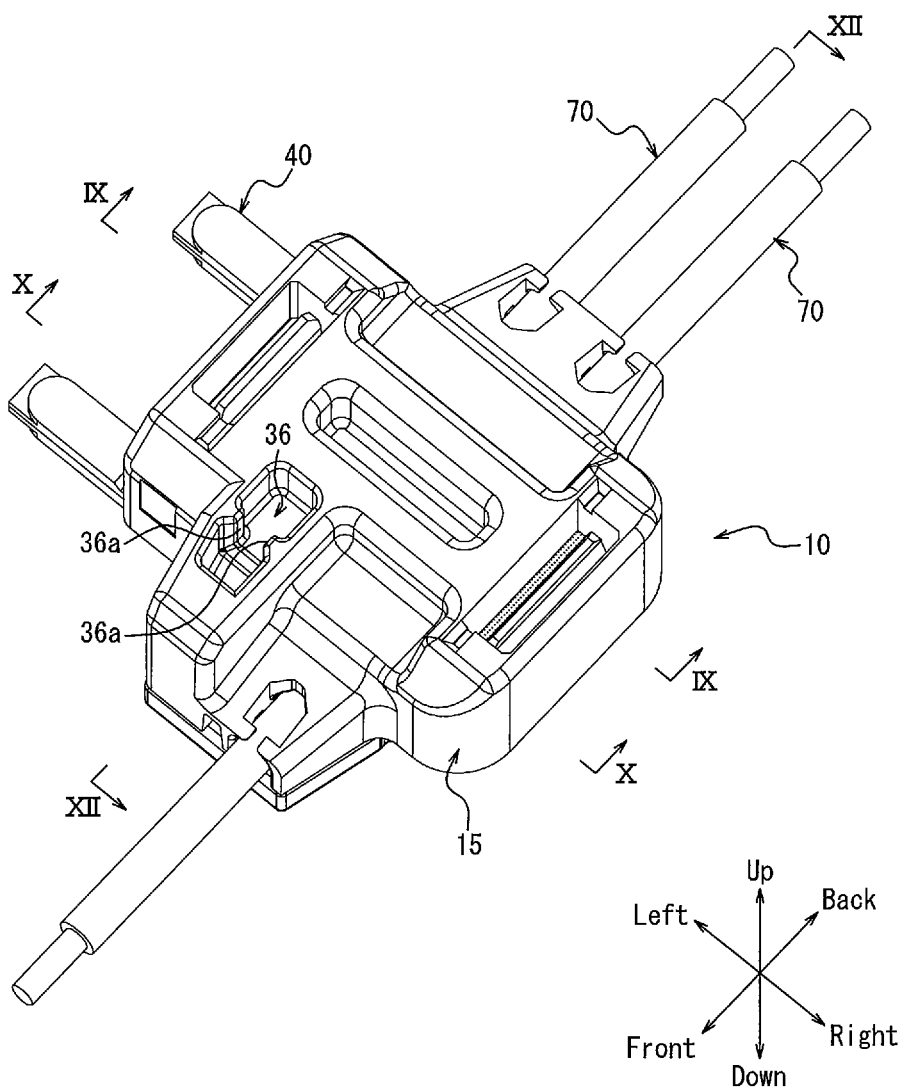
FIG. 1 is an external perspective view of a connector according to an embodiment attached to an object.

In the branch connector described in PTL 1, one of two objects terminates inside the fitting bodies, and its end is accommodated inside the fitting bodies. Protection treatment for the end, such as waterproofing, dustproofing, insulation, and rustproofing, is, however, not fully considered. It is desirable to subject the end of the object to sufficient protection treatment in such a connector.

It can be contemplated to sufficiently protect the end by covering the end of the object with a filler provided in the fitting body. In this case, a pressure applied to the filler varies depending on a location or a diameter of the object. For example, there is a risk that some objects may cause an application of a great pressure on the filler and an excess portion of the filler may inhibit the fitting bodies from fitting together, whereby a protective effect of the end of the object may be compromised.

With a connector according to an embodiment of the present disclosure, influence of variations in operation is suppressed, and stable protection effect can be achieved.

An embodiment of the present disclosure will be described in detail below, with reference to the attached drawings. The directions such as front, back, right, left, up, and down in the following description are based on the directions of the arrows in the drawings. The directions of the arrows are consistent throughout FIGS. 1 to 17.

Figure 2:
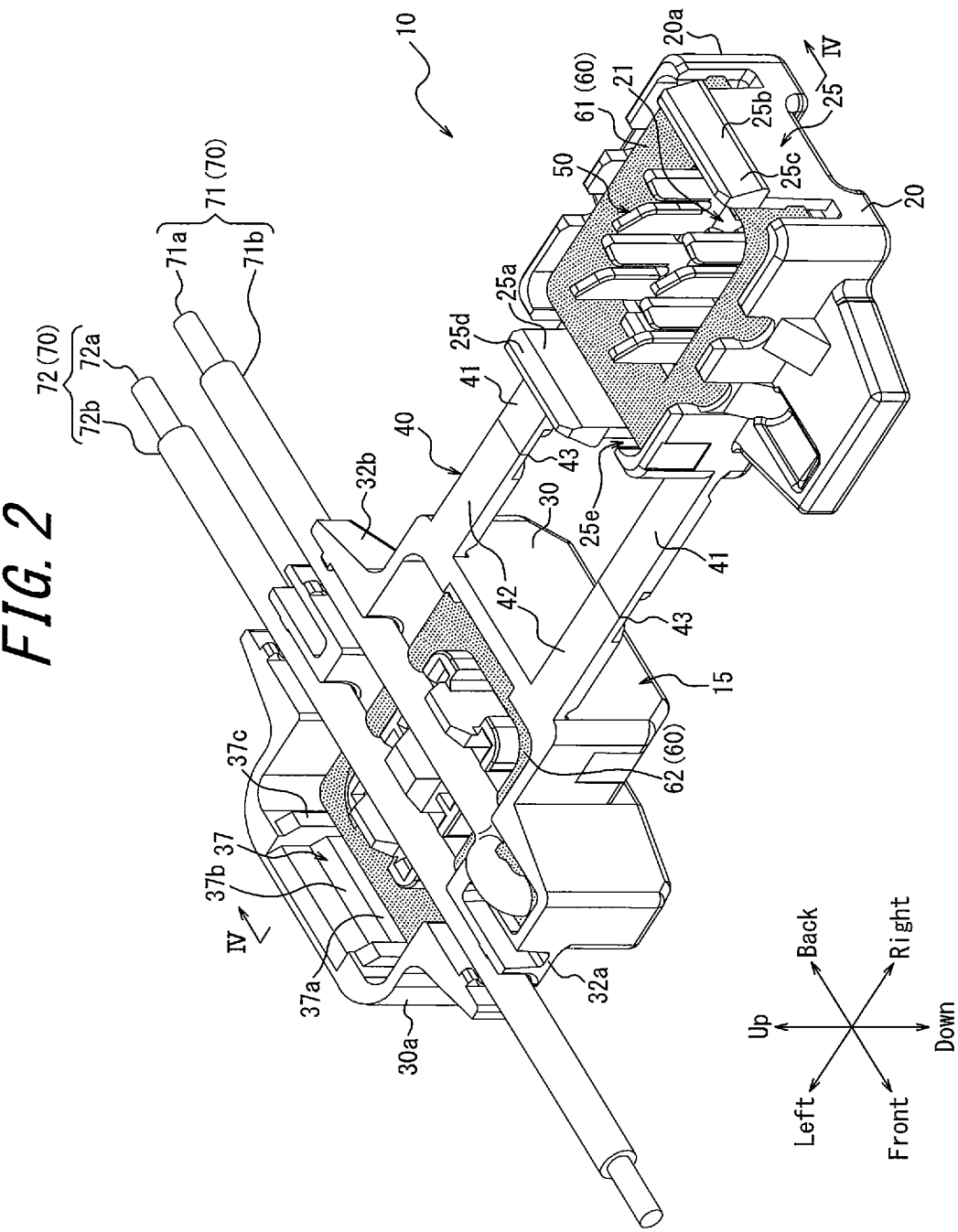
FIG. 2 is a perspective view of the connector in FIG. 1 provisionally holding the object in an expanded state.
Figure 3:
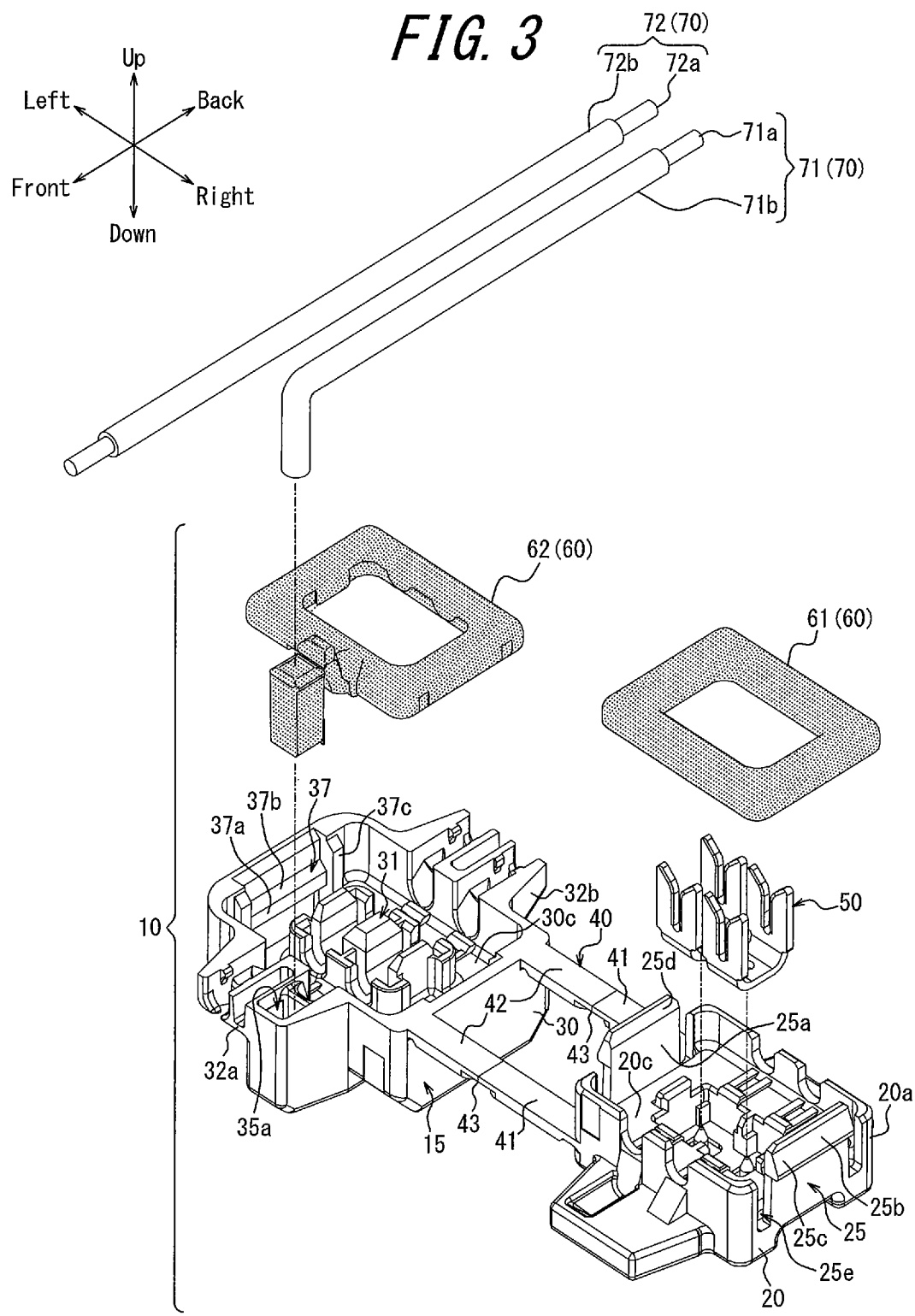
FIG. 3 is an exploded perspective view of the connector and the object in FIG. 2.
Figure 4:
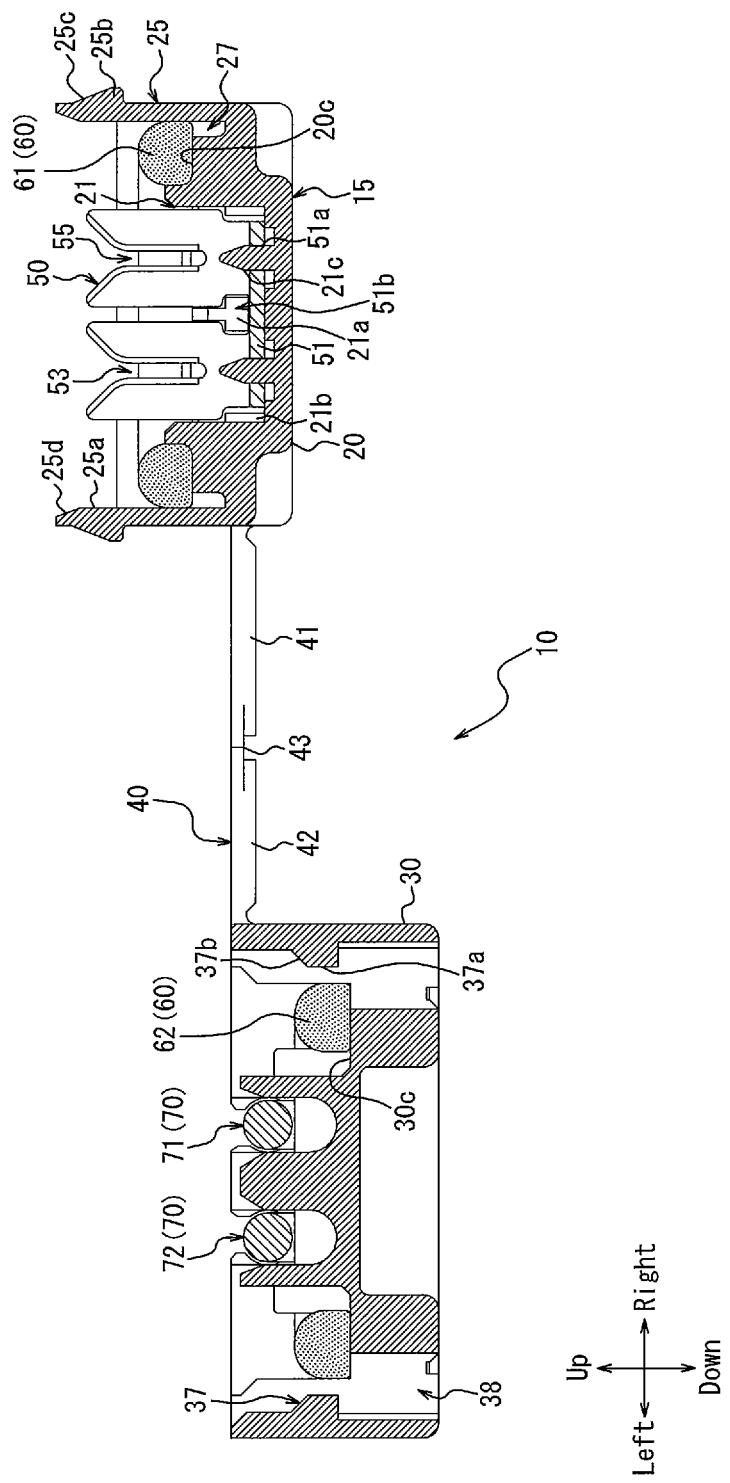
FIG. 4 is a sectional view along arrow IV-IV in FIG. 2.

FIG. 1 is an external perspective view of a connector 10 according to an embodiment attached to an object 70. FIG. 2 is a perspective view of the connector 10 in FIG. 1 provisionally holding the object 70 in an expanded state. FIG. 3 is an exploded perspective view of the connector 10 and the object 70 in FIG. 2. FIG. 4 is a sectional view along arrow IV-IV in FIG. 2.

With reference to FIG. 3, the connector 10 according to this embodiment includes a housing 15, a relay contact 50, and a filler 60 as main structural elements. The connector 10 is a branch connector that clamps a core wire of each object 70 such as a cable by the relay contact 50 to bring the objects 70 into conduction with each other. For example, the connector 10 electrically branches one object 70 into two objects 70. More specifically, the connector 10 holds two objects 70. One of the objects 70 terminates inside the connector 10, and its end is accommodated in the connector 10. The other one of the objects 70 extends from the front and back ends of the connector 10 and extends in the front-back direction.

In the connector 10, the housing 15 and the filler 60 surround the connection portion between the relay contact 50 and the object 70 and cover an end of the object 70 to isolate them from the outside, in a state of holding the object 70. The connector 10 provides protection functions such as waterproof function, dustproof function, insulation function, and rustproof function for the connection portion between the relay contact 50 and the object 70 and the end of the object 70 located inside the housing 15.

With reference to FIGS. 3 and 4, the housing 15 is a molded component made of an insulating and heat-resistant synthetic resin material. The housing 15 includes a pair of fitting bodies that are fittable to each other. More specifically, the housing 15 includes a first housing 20 and a second housing 30 that are fittable to each other. The housing 15 includes a connection portion 40 as a connection that connects the first housing 20 and the second housing 30. The first housing 20, the second housing 30, and the connection portion 40 are integrally formed in the housing 15.

The connection portion 40 includes a pair of first connection portions 41 at the front and the back linearly extending in the leftward direction from the first housing 20. The connection portion 40 includes a pair of second connection portions 42 at the front and the back linearly extending in the rightward direction from the second housing 30. The connection portion 40 includes bendable portions 43 that connect the first connection portions 41 and the second connection portions 42. In an expanded state, the upper surfaces of the pair of first connection portions 41 at the front and the back and the upper surfaces of the pair of second connection portions 42 at the front and the back form approximately the same plane.

The bendable portions 43 are thinner than the first connection portions 41 and the second connection portions 42 at the front and the back. The first connection portions 41 and the second connection portions 42 at the front and the back can be valley-folded with the bendable portions 43 extending in the front-back direction as a folding line. The connection portion 40 can be bent in a direction in which the first housing 20 and the second housing 30 approach each other. The first housing 20, the first connection portions 41, the bendable portions 43, the second connection portions 42, and the second housing 30 have rigidity sufficient to autonomously maintain the expanded state.

The connection portion 40 connects the first housing 20 and the second housing 30 to each other, thus easing the operation of attaching the connector 10 to the object 70 by an assembly operator or the like.

The filler 60 includes a first filler 61 and a second filler 62 with which the first housing 20 and the second housing 30 are respectively loaded. The filler 60 contains any material having cementing properties or sticking properties, such as a UV curing resin, a waterproof gel, or an adhesive. More specifically, in a state in which the first housing 20 and the second housing 30 are fitted to each other, the first filler 61 and the second filler 62 may cement to each other so as to be integral inside the first housing 20 and the second housing 30, or stick to each other to form an interface. In the following description, it is assumed that the filler 60 has cementing properties.

For example, the filler 60 is made of a UV curing resin that effectively exhibits protection functions such as waterproof function, dustproof function, insulation function, and rustproof function. Specifically, the filler 60 is made of a material containing, as a main ingredient, urethane acrylate, epoxy acrylate, acrylic resin acrylate, polyester acrylate, polybutadiene acrylate, silicone acrylate, amino resin acrylate, urethane vinyl ether, polyester vinyl ether, silicone elastomer, styrene elastomer, polyethylene-polystyrene elastomer, or the like. For example, the filler 60 is made of a material containing, as a main ingredient, urethane acrylate that has cementing properties, elasticity, and heat resistance.

With reference to FIG. 3, the object 70 includes a first cable 71 and a second cable 72. The first cable 71 and the second cable 72 are formed by covering the surfaces of core wires 71a and 72a with sheaths 71b and 72b, respectively. The core wires 71a and 72a are each made of a conductive and flexible material such as copper or aluminum. The core wires 71a and 72a may be stranded wires or single wires. The sheaths 71b and 72b are flexible and insulating tubular sheaths. The first cable 71 is a cable that is provided inside a wiring object such as an automobile from the beginning and is connected to a power source of the wiring object. The second cable 72 is a cable that is subsequently connected as an addition to electrically branch the first cable 71. One end of the second cable 72 is connected to, for example, an electronic device or an electrical device such as a car navigation system.

Figure 5:
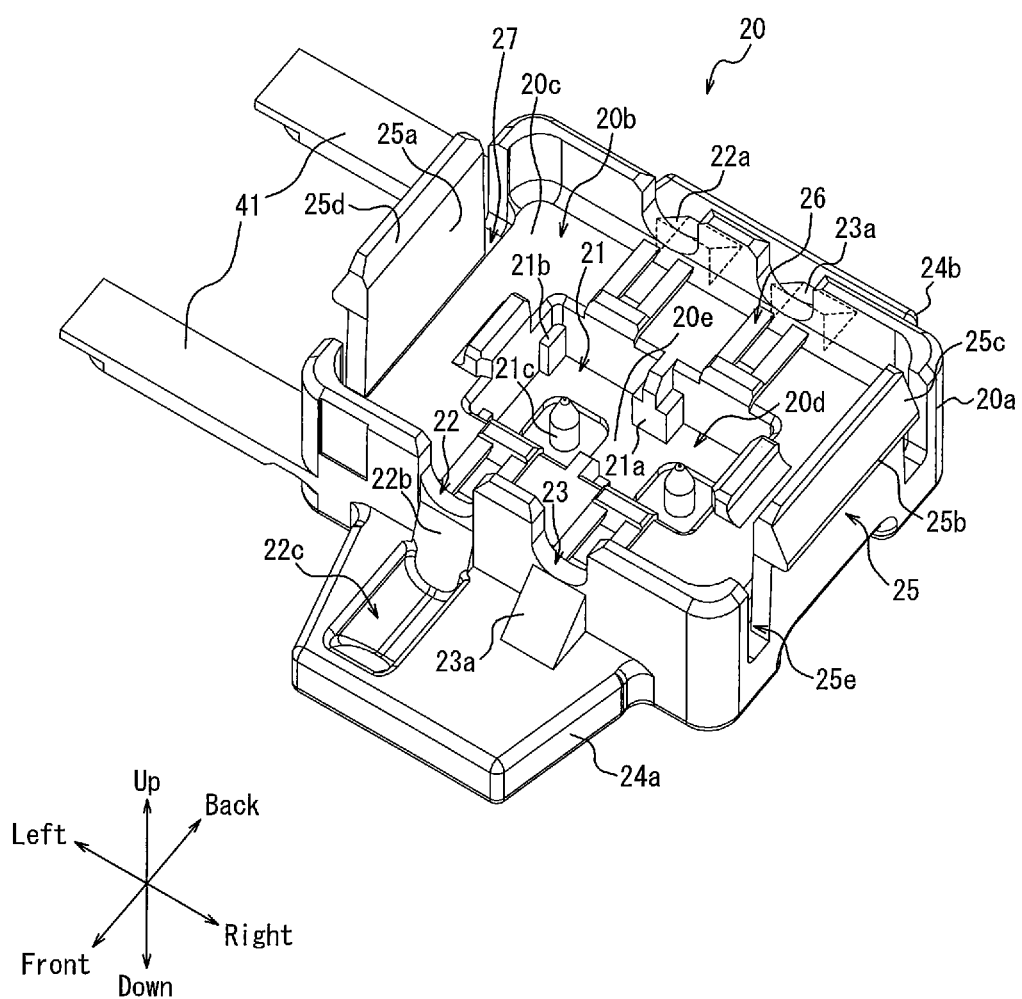
FIG. 5 is an enlarged perspective view of a first housing.

FIG. 5 is an enlarged perspective view of the first housing 20. The structure of the first housing 20 will be described in detail below, with reference to FIG. 5.

The first housing 20 has an outer peripheral wall 20a protruding upward from the outer peripheral edges at the bottom. The outer peripheral wall 20a encloses the inside of the first housing 20. The first housing 20 has a first recess 20b recessed in an approximately rectangular shape in a top view, on the inner peripheral side of the outer peripheral wall 20a. The bottom surface of the first recess 20b is formed by a first facing surface 20c that is an approximately horizontal plane. The first housing 20 has a central recess 20d recessed downward in a stepwise manner, in the central part of the first facing surface 20c. The bottom surface of the central recess 20d is formed by a central facing surface 20e that is a plane parallel to the first facing surface 20c. The first housing 20 has a contact mounting groove 21 formed by the central recess 20d. The contact mounting groove 21 has an intermediate projection 21a that is located at the middle in the right-left direction to narrow the front-back width of the contact mounting groove 21 and delimit the contact mounting groove 21 into a pair of right and left parts. The intermediate projection 21a is approximately shaped to have a protrusion at its center in a front view. The contact mounting groove 21 has protruding portions 21b at four corners on the central facing surface 20e side. The protruding portions 21b narrow the front-back width of the contact mounting groove 21, as with the intermediate projection 21a. The contact mounting groove 21 has a pair of positioning protrusions 21c protruding upward from the central facing surface 20e. The positioning protrusions 21c each taper down toward a tip from an approximately cylindrical base.

The first housing 20 has a pair of first cable mounting grooves 22 and a pair of second cable mounting grooves 23 recessed on the front and back sides of the outer peripheral wall 20a. The first cable mounting grooves 22 are located on the front and back sides of the left half part of the contact mounting groove 21, and are approximately on the same axis. The second cable mounting grooves 23 are located on the front and back sides of the right half part of the contact mounting groove 21, and are approximately on the same axis. The second cable mounting grooves 23 are parallel to the first cable mounting grooves 22. The front shape of the first cable mounting grooves 22 and the second cable mounting grooves 23 is approximately a U-shape.

The first housing 20 has a slope 22a inclined toward the outside in the downward direction from the deepest bottom surface of the first cable mounting groove 22 on the back side. The first housing 20 has a pair of slopes 23a inclined toward the outside in the downward direction from the deepest bottom surfaces of the pair of second cable mounting grooves 23. The first housing 20 has a platelike lid portion 24a formed at a position below the slope 23a on the front side and extending forward from the front surface of the outer peripheral wall 20a. The first housing 20 has a platelike lid portion 24b formed at a position below the slope 22a and the slope 23a on the back side and extending backward from the back surface of the outer peripheral wall 20a. The upper surfaces of the lid portions 24a and 24b are at the same height as the lowest parts of the slopes 22a and 23a.

The first housing 20 has a first wall portion 22b inclined toward the outside in the downward direction from a position slightly away downward from the deepest bottom surface of the first cable mounting groove 22 on the front side. The first wall portion 22b is steeper than the slope 22a. The lower end of the first wall portion 22b is located lower than the upper surface of the lid portion 24a. The first housing 20 has a receiving portion 22c that is continuous with the first wall portion 22b and forms a recess of a predetermined width extending in the forward direction in the lid portion 24a. The receiving portion 22c is formed by a groove continuous with the first wall portion 22b and approximately U-shaped in cross section and a slope continuous with the groove and inclined toward the outside in the upward direction.

The first housing 20 has a pair of first locking portions 25 formed on the right and left sides of the outer peripheral wall 20a and extending in the front-back direction, as illustrated in FIGS. 4 and 5. The first locking portions 25 have elasticity. The first locking portions 25 protrude upward from the upper edges of the outer peripheral wall 20a on the front and back sides in a stepwise manner. The first locking portions 25 each have an inner surface 25a formed in the up-down direction approximately in a plane shape. The first locking portions 25 have first locking protrusions 25b protruding outward from the right and left surfaces of the outer peripheral wall 20a. The first locking protrusions 25b extend in the front-back direction. The first locking portions 25 each have a slope 25c that forms the outer surface of the first locking protrusion 25b and is inclined toward the outside of the first housing 20 in the downward direction. The first locking portions 25 each have a slope 25d that is formed at the upper edge of the inner surface 25a and inclined toward the outside of the first housing 20 in the upward direction. The first housing 20 has four notches 25e on the front and back sides of the first locking portions 25. The notches 25e are each formed by cutting out the corresponding part of the outer peripheral wall 20a in the protrusion direction of the first locking portion 25, i.e. the up-down direction. The notches 25e ease elastic deformation of the first locking portions 25, and improve the fitting between the first housing 20 and the second housing 30.

The first housing 20 has a pair of pressing portions 26 protruding on the first facing surface 20c between the pair of first cable mounting grooves 22 and the contact mounting groove 21 and between the pair of second cable mounting grooves 23 and the contact mounting groove 21, as illustrated in FIG. 5. The pair of pressing portions 26 are each formed by a pair of ribs arranged side by side in the right-left direction and extending in the front-back direction. The first housing 20 has recesses 27 that are each recessed on the inner side of the lower edge of the corresponding first locking portion 25, as illustrated in FIGS. 4 and 5. The recesses 27 are each formed along the lower edge of the corresponding first locking portion 25 in a state of being recessed downward from the first facing surface 20c in a stepwise manner.

Figure 6:
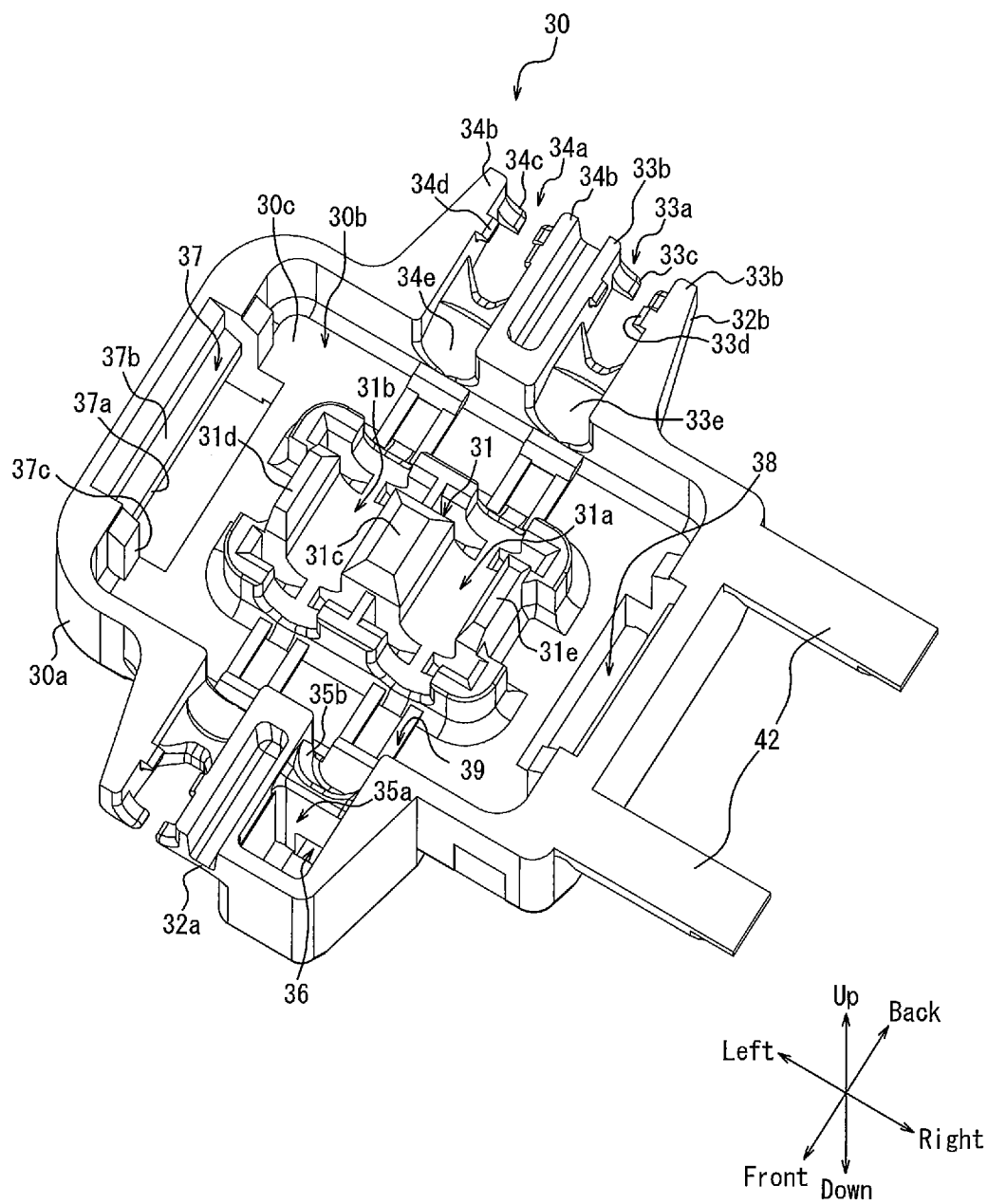
FIG. 6 is an enlarged perspective view of a second housing.

FIG. 6 is an enlarged perspective view of the second housing 30. The structure of the second housing 30 will be described in detail below, with reference to FIG. 6.

The second housing 30 has an outer peripheral wall 30a protruding upward from the outer peripheral edges at the bottom. The outer peripheral wall 30a encloses the inside of the second housing 30. The second housing 30 has a second recess 30b recessed in an approximately rectangular shape in a top view, on the inner peripheral side of the outer peripheral wall 30a. The bottom surface of the second recess 30b is formed by a second facing surface 30c that is an approximately horizontal plane. The second housing 30 has a cable pressing protrusion 31 protruding from the central part of the second facing surface 30c. The cable pressing protrusion 31 has a pair of a first pressing groove 31a and a second pressing groove 31b at the right and the left, which are approximately U-shaped in cross section. The cable pressing protrusion 31 has a central protrusion 31c and protrusions 31d and 31e located on the left and right sides of the central protrusion 31c. The first pressing groove 31a is formed between the central protrusion 31c and the protrusion 31e. The second pressing groove 31b is formed between the central protrusion 31c and the protrusion 31d.

The second housing 30 has cable support arm portions 32a and 32b protruding in the front-back direction from the front and back sides of the outer peripheral wall 30a. The second housing 30 has a first cable holding groove 33a recessed in the right half part of the cable support arm portion 32b. The first cable holding groove 33a is approximately on the same axis as the first pressing groove 31a. The back part of the first cable holding groove 33a is formed by a pair of protrusion pieces 33b separated right and left by a gap. The pair of protrusion pieces 33b have a pair of claw portions 33c protruding inward from the lower end of the back end and facing each other. The pair of protrusion pieces 33b have a pair of anti-dropout protrusions 33d located inward from the pair of claw portions 33c, protruding in the right-left direction from the upper edge, and facing each other. The first cable holding groove 33a has a slope 33e located inward from the pair of anti-dropout protrusions 33d and inclined downward in the inward direction.

The second housing 30 has a pair of second cable holding grooves 34a recessed in the left half parts of the cable support arm portions 32a and 32b respectively. The pair of second cable holding grooves 34a are approximately on the same axis as the second pressing groove 31b. The outer part of each second cable holding groove 34a is formed by a pair of protrusion pieces 34b separated right and left by a gap. The pair of protrusion pieces 34b have a pair of claw portions 34c protruding inward from the lower end of the outer end and facing each other. The pair of protrusion pieces 34b have a pair of anti-dropout protrusions 34d located inward from the pair of claw portions 34c, protruding in the right-left direction from the upper edge, and facing each other. Each second cable holding groove 34a has a slope 34e located inward from the pair of anti-dropout protrusions 34d and inclined downward in the inward direction.

The first cable holding groove 33a and the second cable holding grooves 34a have a depth sufficient to insert and hold the first cable 71 and the second cable 72 for the whole diameter. The pairs of protrusion pieces 33b and 34b, in particular the protrusion pieces on the right and left outer sides of the cable support arm portions 32a and 32b, elastically flex in the right-left direction. The spacing between adjacent protrusion pieces is variable. The anti-dropout protrusions 33d and 34d allow the first cable 71 and the second cable 72 to be inserted respectively into the first cable holding groove 33a and the second cable holding grooves 34a. Here, the pairs of protrusion pieces 33b and 34b, that is, the pairs of anti-dropout protrusions 33d and 34d, flex so as to widen the spacing in the right-left direction.

When the first cable 71 and the second cable 72 are inserted into the first cable holding groove 33a and the second cable holding grooves 34a, the pairs of anti-dropout protrusions 33d and 34d respectively clamp the first cable 71 and the second cable 72. The pairs of protrusion pieces 33b and 34b elastically flex so as to narrow the spacing in the right-left direction. Hence, the pairs of protrusion pieces 33b and 34b allow the first cable 71 and the second cable 72 inserted in the first cable holding groove 33a and the second cable holding grooves 34a to move in the cable extending direction, while applying resistance. In addition, the pairs of protrusion pieces 33b and 34b function as retainers by applying resistance to a force which attempts to separate the first cable 71 and the second cable 72 from the first cable holding groove 33a and the second cable holding grooves 34a, thus preventing the first cable 71 and the second cable 72 from coming out easily. This retention function is maintained even when the second housing 30 is turned upside down. Meanwhile, the pairs of protrusion pieces 33b and 34b allow the first cable 71 and the second cable 72 to separate from the first cable holding groove 33a and the second cable holding grooves 34a when subjected to at least a predetermined external force. Thus, the connector 10 can be replaced easily, and the first cable 71 and the second cable 72 attached to and removed from the connector 10 can be changed easily.

The second housing 30 has an accommodating portion 35a recessed in the up-down direction in the right half part of the cable support arm portion 32a. The accommodating portion 35a is a recess approximately rectangular in a top view. The accommodating portion 35a extends over the whole up-down width of the second housing 30. The second housing 30 has a second wall portion 35b adjacent to the accommodating portion 35a on the inner side. The second wall portion 35b is inclined toward the inside of the second housing 30 in the downward direction from near an opening at the upper end of the accommodating portion 35a. The second wall portion 35b is steeper than the slopes 33e and 34e. The accommodating portion 35a and the second wall portion 35b are approximately on the same axis as the first pressing groove 31a and the first cable holding groove 33a.

The second housing 30 has a receiving portion 36 that connects to the accommodating portion 35a and into which the filler 60 enters. The receiving portion 36 is a recess exposed to the outside, as illustrated in FIG. 1. The receiving portion 36 connects to the accommodating portion 35a formed inside the second housing 30 through an opening at the bottom, as illustrated in FIG. 6. The receiving portion 36 has a braking portion 36a that prevents the filler 60 from moving to the side opposite to the accommodating portion 35a in the receiving portion 36, i.e. the back side in FIG. 1. The braking portion 36a is a protrusion portion protruding from the surface of the receiving portion 36 in a direction approximately orthogonal to the moving direction of the filler 60, i.e. the right-left direction. The receiving portion 36 gradually widens from the accommodating portion 35a side in the backward direction, then decreases in right-left width by the braking portion 36a, and maintains an approximately constant right-left width on the back side of the braking portion 36a.

The second housing 30 has a pair of second locking portions 37 formed on the right and left inner surfaces of the outer peripheral wall 30a, as illustrated in FIGS. 4 and 6. The second locking portions 37 each have a second locking protrusion 37a protruding from the inner surface of the outer peripheral wall 30a and extending in the front-back direction. The lower part of the second locking protrusion 37a has an approximately rectangular parallelepiped shape. The upper part of the second locking protrusion 37a gradually decreases in right-left width in the upward direction. The second locking portions 37 each have a slope 37b forming the surface of the second locking protrusion 37a and inclined toward the outside of the second housing 30 in the upward direction. The second housing 30 has a pair of protrusion walls 37c protruding on the front and back sides of each second locking portion 37 and extending in the up-down direction. The second locking protrusion 37a is formed at the inner surface of the second housing 30 so as to extend between the pair of protrusion walls 37c.

The second housing 30 has through holes 38 formed at the right and left ends of the second facing surface 30c. The through holes 38 each extend in the front-back direction, and have the same front-back width as the second locking protrusions 37a. The second housing 30 has a pair of pressing portions 39 protruding on the second facing surface 30c between the first cable holding groove 33a and the second wall portion 35b and the cable pressing protrusion 31 and between the pair of second cable holding grooves 34a and the cable pressing protrusion 31. The pair of pressing portions 39 are each formed by a pair of ribs arranged side by side in the right-left direction and extending in the front-back direction.

Figure 7:
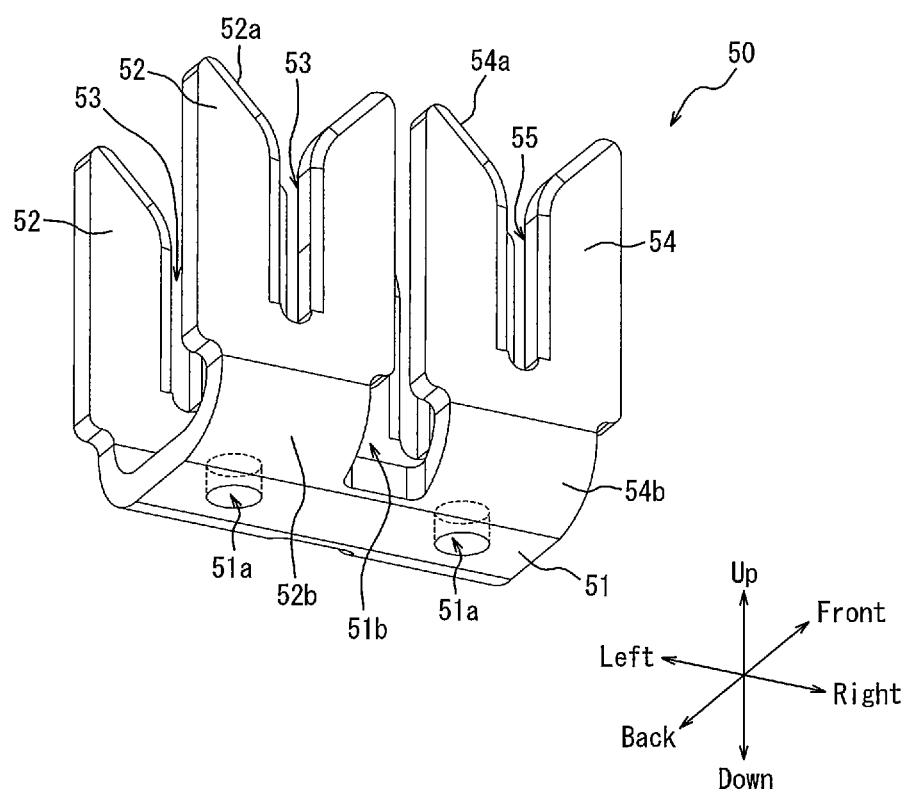
FIG. 7 is a perspective view of a relay contact in isolation.

FIG. 7 is a perspective view of the relay contact 50 in isolation. The structure of the relay contact 50 will be described in detail below, with reference to FIG. 7.

The relay contact 50 is obtained by forming a thin plate of a copper alloy or a corson copper alloy having spring elasticity, such as phosphor bronze, beryllium copper, or titanium copper, into the illustrated shape using progressive molding (stamping). The surface of the relay contact 50 is nickel-plated to form a base, and then tin-copper-plated, tin-plated, or gold-plated.

The relay contact 50 has a platelike base piece 51 extending in the right-left direction. The relay contact 50 has a pair of platelike first cable press-contact pieces 52 protruding at the left half part of the front and back edges of the base piece 51 and extending in a direction orthogonal to the base piece 51. The relay contact 50 has a pair of platelike second cable press-contact pieces 54 protruding at the right half part of the front and back edges of the base piece 51 and extending in the direction orthogonal to the base piece 51. The relay contact 50 has a circular positioning hole 51a at each of two locations right and left in the base piece 51. The relay contact 50 has a first press-contact groove 53 formed in each of the first cable press-contact pieces 52 and a second press-contact groove 55 formed in each of the second cable press-contact pieces 54. The first press-contact groove 53 and the second press-contact groove 55 are each formed by a slit linearly extending toward the base piece 51. The upper opening of the first press-contact groove 53 is approximately V-shaped by a tip 52a, i.e. shaped to widen upward. The upper opening of the second press-contact groove 55 is approximately V-shaped by a tip 54a, i.e. shaped to widen upward.

The pair of first cable press-contact pieces 52 and the pair of second cable press-contact pieces 54 at the front and the back are respectively connected to the base piece 51 via narrow portions 52b and 54b. The spacing between the facing edges of the first cable press-contact piece 52 and the second cable press-contact piece 54 arranged in the right-left direction is narrower than the spacing between the facing edges of the narrow portion 52b and the narrow portion 54b. The relay contact 50 has a play portion 51b between the narrow portion 52b and the narrow portion 54b.

In a fitting state in which the first housing 20 and the second housing 30 are fitted to each other, the relay contact 50 is contained in a state of being electrically connected to the first cable 71 and the second cable 72. More specifically, in the fitting state, the relay contact 50 brings the first cable 71 and the second cable 72 into conduction with each other as a result of the first press-contact groove 53 and the second press-contact groove 55 cutting the insulating sheaths 71b and 72b and clamping the core wires 71a and 72a, respectively.

Figure 8A:
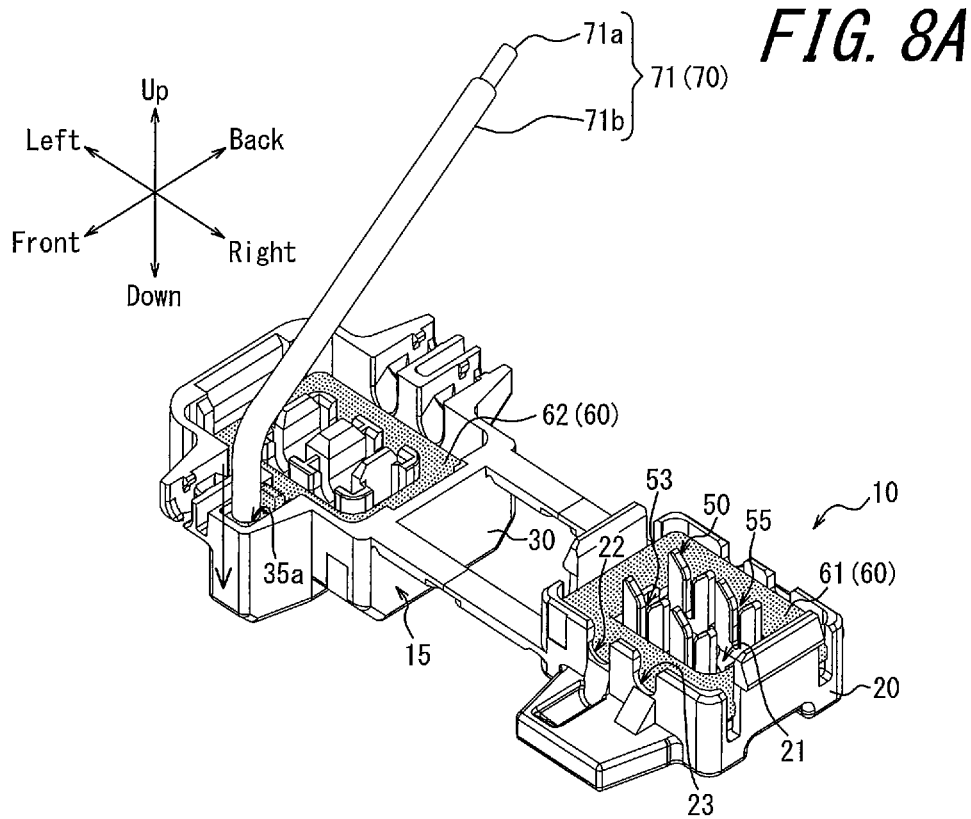
FIG. 8A is a schematic view illustrating a first step in an attachment method of attaching the connector to the object.
Figure 8B:
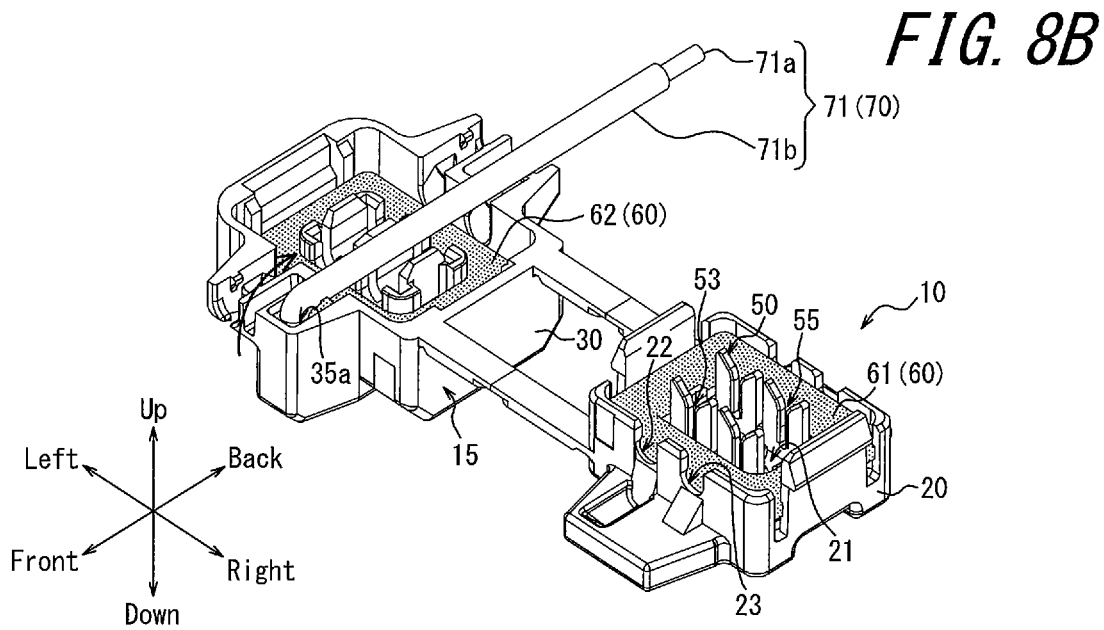
FIG. 8B is a schematic view illustrating a second step in the attachment method of attaching the connector to the object.
Figure 8C:
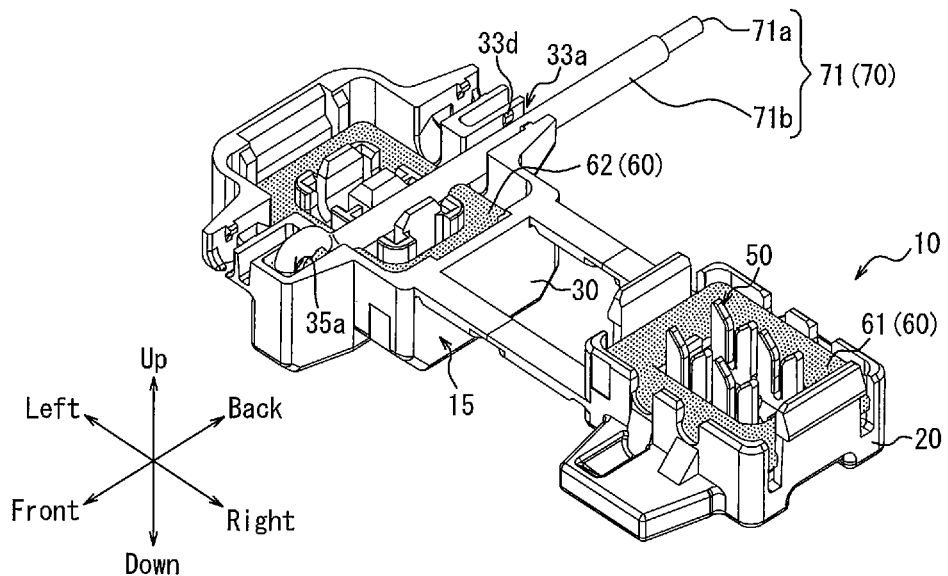
FIG. 8C is a schematic view illustrating a third step in the attachment method of attaching the connector to the object.
Figure 8D:
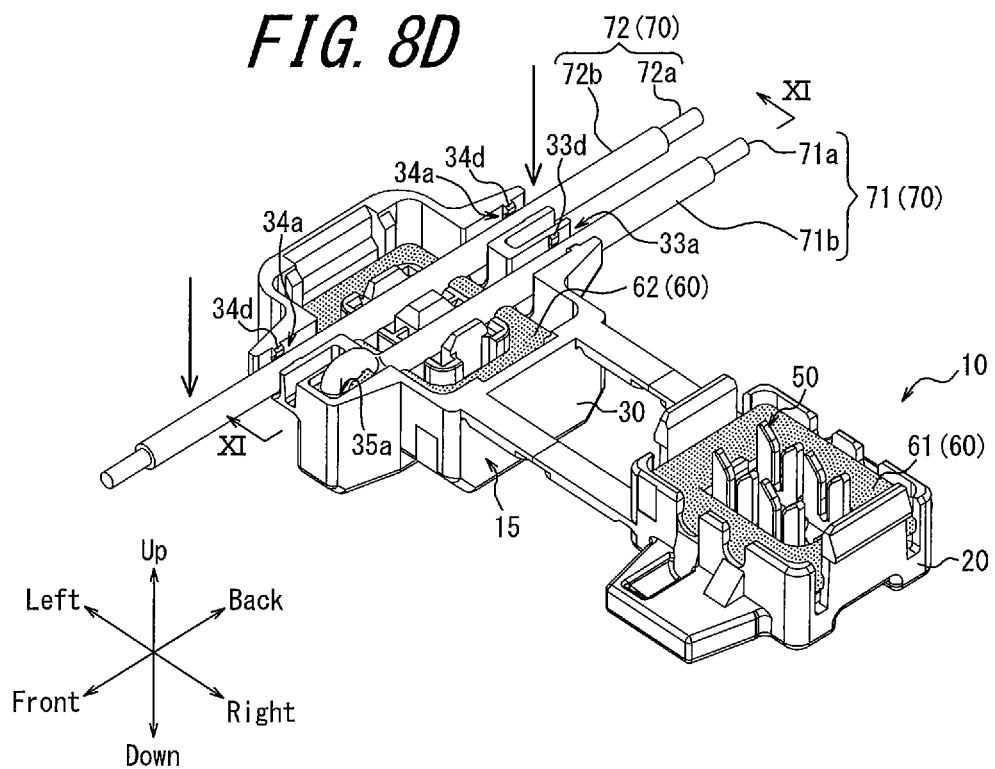
FIG. 8D is a schematic view illustrating a fourth step in the attachment method of attaching the connector to the object.
Figure 8E:
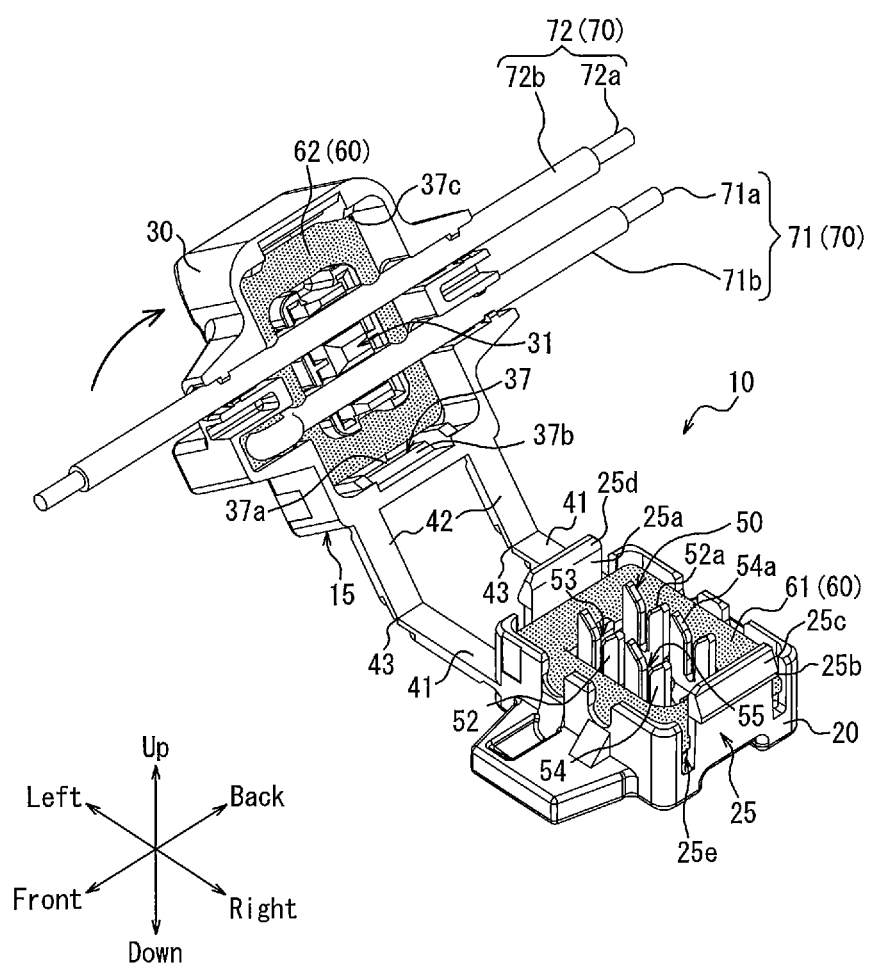
FIG. 8E is a schematic view illustrating a fifth step in the attachment method of attaching the connector to the object.
Figure 8F:
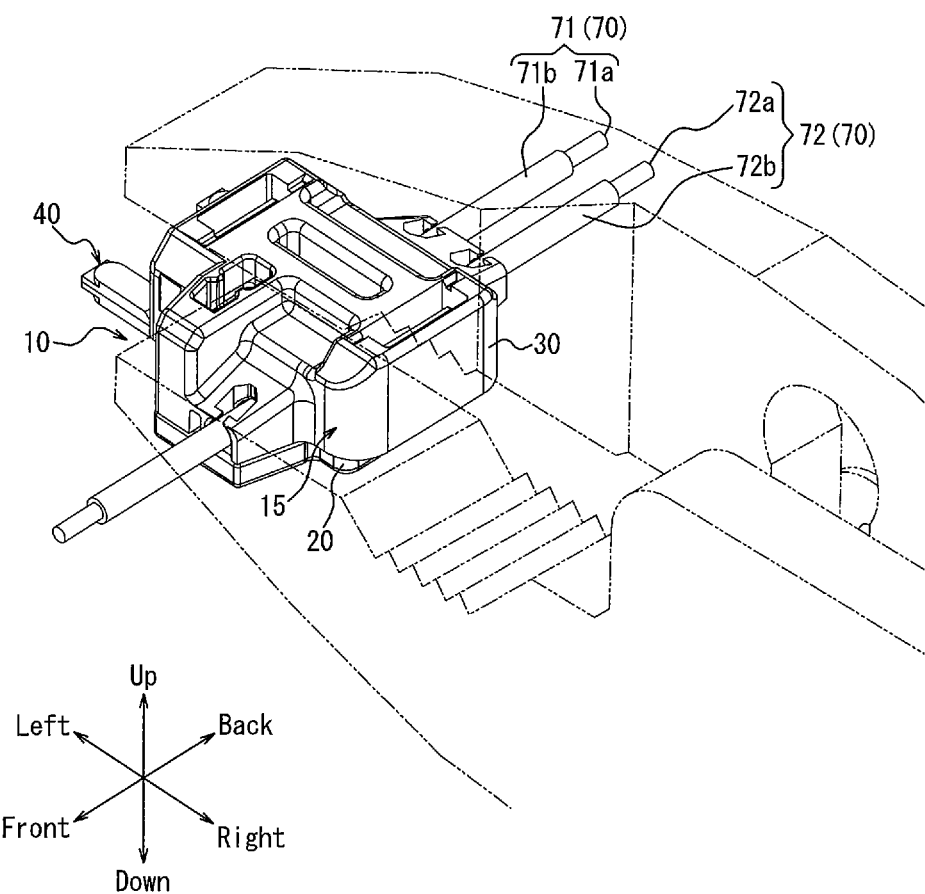
FIG. 8F is a schematic view illustrating a sixth step in the attachment method of attaching the connector to the object.

FIG. 8A is a schematic view illustrating a first step in an attachment method of attaching the connector 10 to the object 70. FIG. 8B is a schematic view illustrating a second step in the attachment method of attaching the connector 10 to the object 70. FIG. 8C is a schematic view illustrating a third step in the attachment method of attaching the connector 10 to the object 70. FIG. 8D is a schematic view illustrating a fourth step in the attachment method of attaching the connector 10 to the object 70. FIG. 8E is a schematic view illustrating a fifth step in the attachment method of attaching the connector 10 to the object 70. FIG. 8F is a schematic view illustrating a sixth step in the attachment method of attaching the connector 10 to the object 70. The attachment method for the connector 10 will be described in detail below, with reference to FIGS. 8A to 8F.

An assembly operator or the like fits the lower part of the relay contact 50 into the contact mounting groove 21 of the first housing 20 in an expanded state illustrated in FIG. 2, for example by hand. Specifically, in a state in which the right and left ends of the base piece 51 are aligned with the protruding portions 21b, the base piece 51 is fitted into the bottom of the contact mounting groove 21 with the intermediate projection 21a being fitted into the play portion 51b, as illustrated in FIG. 4. The pair of positioning protrusions 21c of the first housing 20 are fitted into the pair of positioning holes 51a of the base piece 51, so that the relay contact 50 is positioned relative to the first housing 20. When the relay contact 50 is mounted in the first housing 20, the first press-contact grooves 53 at the front and the back are located on an axis through the first cable mounting grooves 22 at the front and the back, and the second press-contact grooves 55 at the front and the back are located on an axis through the second cable mounting grooves 23 at the front and the back.

The pair of the first housing 20 and the second housing 30 that are fittable to each other are loaded with the filler 60. More specifically, the filler 60 is provided on the first facing surface 20c of the first housing 20 and on the second facing surface 30c of the second housing 30. The filler 60 is provided in the accommodating portion 35a and on the second wall portion 35b of the second housing 30. As illustrated in FIG. 3, the shape of the lower surface of the first filler 61 provided on the first facing surface 20c is approximately the same as the surface shape of the first facing surface 20c. Likewise, the shape of the lower surface of the second filler 62 provided on the second facing surface 30c is approximately the same as the surface shape of the second facing surface 30c. The heights of the first filler 61 and the second filler 62 are such that the first filler 61 and the second filler 62 cement to each other when the first housing 20 and the second housing 30 are fitted to each other. The first filler 61 surrounds the relay contact 50. The second filler 62 surrounds the cable pressing protrusion 31.

In such a state in which the relay contact 50 is mounted in the housing 15 and the housing 15 is loaded with the filler 60, the first cable 71 and the second cable 72 are attached to the housing 15. In the first step illustrated in FIG. 8A, an end of the first cable 71 is inserted from above into the accommodating portion 35a formed in the second housing 30 and loaded with the filler 60. The end of the first cable 71 comes into contact with or close to the bottom surface of the accommodating portion 35a. The filler 60 surrounds the end of the first cable 71 in the accommodating portion 35a.

In the second step illustrated in FIG. 8B following the first step, the first cable 71 is bent. The first cable 71 extends in the up-down direction in the accommodating portion 35a, extends from the accommodating portion 35a and bends, and then extends backward.

In the third step illustrated in FIG. 8C, the first cable 71 is further bent along the second wall portion 35b. In addition, the first cable 71 is pushed in against the resistance of the anti-dropout protrusions 33d. Thus, the first cable 71 is clamped between the bottom of the first cable holding groove 33a and the anti-dropout protrusions 33d, and provisionally held by the second housing 30. Here, the first cable 71 is slightly movable in the extending direction, i.e. the front-back direction, while being subjected to resistance. This enables fine adjustment of the position of the first cable 71 in the extending direction relative to the connector 10 in the expanded state.

In the fourth step illustrated in FIG. 8D, the second cable 72 is pushed into the pair of second cable holding grooves 34a against the resistance of the pair of anti-dropout protrusions 34d at the front and the back. Thus, the second cable 72 is provisionally held by the second housing 30 in the same manner as the first cable 71 that is provisionally held using the first cable holding groove 33a as described above. Here, the second cable 72 is movable in the extending direction, i.e. the front-back direction, while being subjected to resistance. This enables adjustment of the position of the second cable 72 in the extending direction relative to the connector 10 in the expanded state.

In the fifth step illustrated in FIG. 8E, the second housing 30 is rotated about the bendable portions 43 at the front and the back so as to approach the first housing 20. As a result, the second locking protrusion 37a on the right side comes into contact with the slope 25c of the corresponding first locking protrusion 25b on the left side. When the second housing 30 is further rotated, the second locking protrusion 37a slides downward on the slope 25c, and the first locking portion 25 elastically deforms in the inward direction of the first housing 20. Here, the slope 25d formed in the first locking portion 25 prevents the end of the first locking portion 25 from biting into or cutting the second filler 62. The first pressing groove 31a of the cable pressing protrusion 31 slightly pushes the intermediate part of the first cable 71 into the first press-contact grooves 53, i.e. downward. Consequently, the intermediate part of the first cable 71 enters the space between the first cable press-contact pieces 52 at the front and the back.

The second housing 30 is further rotated about the bendable portions 43 at the front and the back so as to approach the first housing 20. Consequently, the second pressing groove 31b of the cable pressing protrusion 31 presses the intermediate part of the second cable 72 against the tips 54a of the second cable press-contact pieces 54 in the extending direction of the second press-contact grooves 55 or in a direction close to the extending direction. The second cable 72 is thus clamped by the tips 54a and the cable pressing protrusion 31.

In the sixth step illustrated in FIG. 8F, the first housing 20 and the second housing 30 are pressed approximately in parallel in a direction in which the first housing 20 and the second housing 30 approach each other, using a general tool such as a pair of pliers. Consequently, each second locking protrusion 37a engages with the corresponding first locking protrusion 25b. Each protrusion wall 37c is fitted into the corresponding notch 25e. Thus, the first housing 20 is accommodated in the second housing 30, and the first locking portions 25 and the second locking portions 37 engage with each other inside the first housing 20 and the second housing 30 fitted to each other.

The first cable 71 is pushed from the tips 52a to approximately the center of the first press-contact grooves 53 by the first pressing groove 31a. As a result, the right and left inner surfaces of the first press-contact grooves 53 break the right and left parts of the sheath 71b of the first cable 71. Accordingly, when the housing 15 is held in a closed state, the right and left inner surfaces of the first press-contact grooves 53 are in contact with the right and left sides of the core wire 71a uniformly and reliably by press contact. The second cable 72 is pushed from the tips 54a to approximately the center of the second press-contact grooves 55 by the second pressing groove 31b, and subjected to press contact as with the first cable 71. Consequently, the core wire 71a of the first cable 71 and the core wire 72a of the second cable 72 are in electrical conduction with each other via the relay contact 50 in the connector 10.

Since the inner surfaces of the first press-contact grooves 53 and the second press-contact grooves 55 do not come into contact with either of the right and left parts of the core wires 71a and 72a too strongly, the first press-contact grooves 53 and the second press-contact grooves 55 are kept from cutting respectively part of the core wires 71a and 72a. This suppresses a decrease in the mechanical strength of the core wires 71a and 72a. Therefore, even when a tensile force acts on the first cable 71 and the second cable 72, the core wires 71a and 72a are unlikely to be completely cut. The reliability of contact between each of the first cable 71 and the second cable 72 and the relay contact 50 can thus be enhanced.

Figure 9:
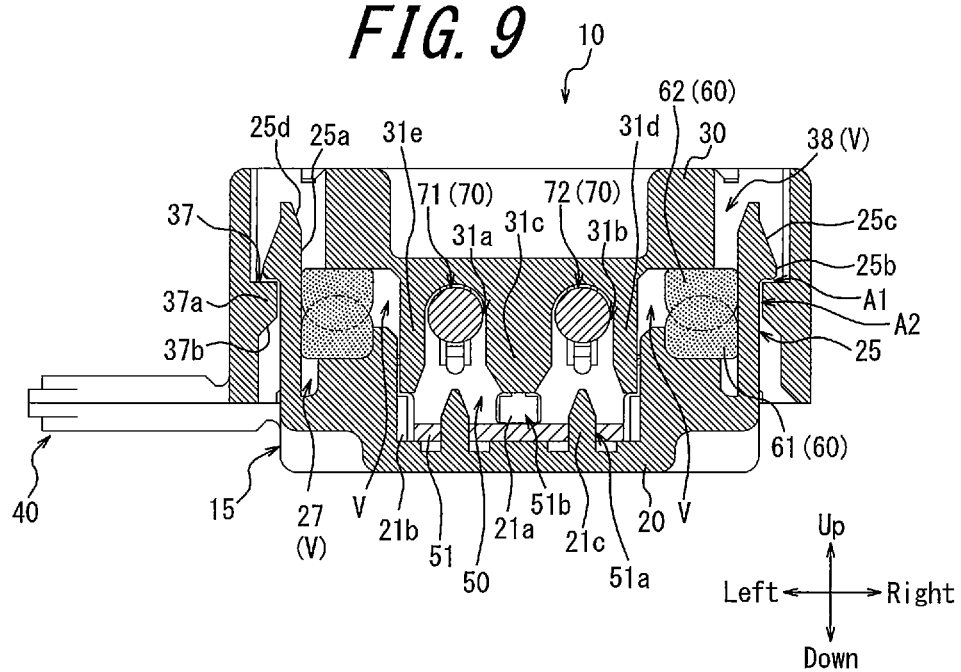
FIG. 9 is a sectional view along arrow IX-IX in FIG. 1.
Figure 10:
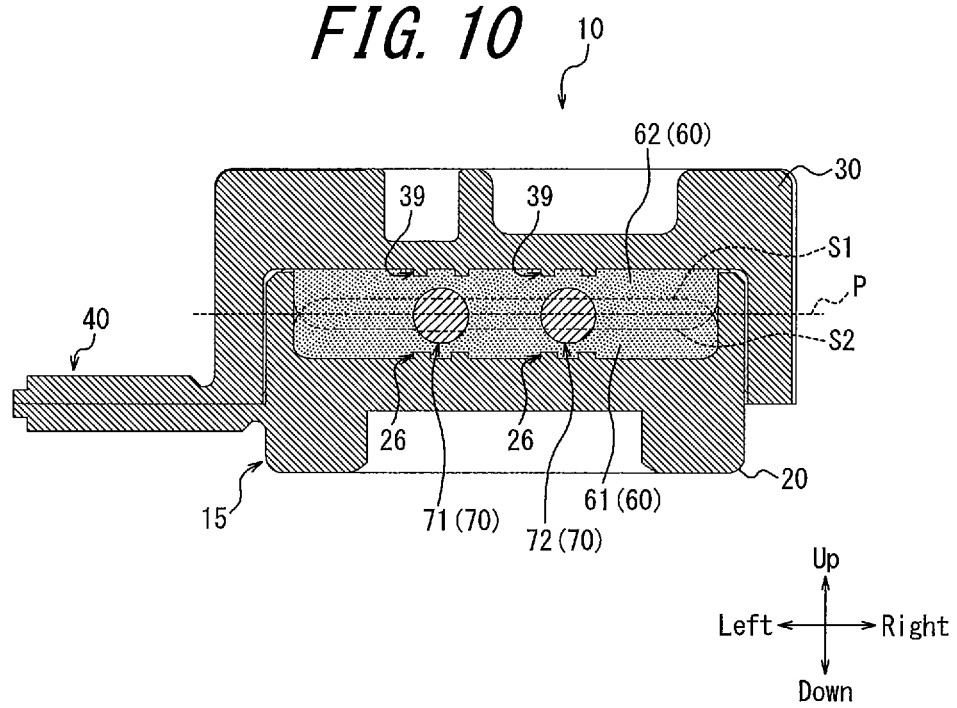
FIG. 10 is a sectional view along arrow X-X in FIG. 1.

FIG. 9 is a sectional view along arrow IX-IX in FIG. 1. FIG. 10 is a sectional view along arrow X-X in FIG. 1. The function of each component in a fitting state in which the first housing 20 and the second housing 30 are fitted to each other will be mainly described below, with reference to FIGS. 9 and 10.

With reference to FIG. 9, the ends of the first locking portions 25 are close to the bottom of the second housing 30. Hence, in an initial stage in which the engagement between the first locking protrusions 25b and the second locking protrusions 37a starts, the ends of the first locking portions 25 are in contact with the outer surface of the second filler 62 in the right-left direction. Even when the fitting progresses and the first locking portions 25 are elastically deformed inward, the ends of the first locking portions 25 do not pierce the lower surface of the second filler 62, and do not separate the second filler 62 right and left. The connector 10 can prevent the filler 60 from coming to the outside of the first locking portions 25 and burying the first locking portions 25 therein in the fitting state.

As a result of the filler 60 being in contact with the inner surface 25a of each first locking portion 25, the elastic first locking portion 25 tries to elastically deform outward by an elastic force from the inside to the outside due to the expansion or swelling of the filler 60. Since the connector 10 has the locking portions inside, such outward elastic deformation of the first locking portion 25 further strengthens the engagement between the first locking portion 25 and the second locking portion 37.

More specifically, as a result of the engagement surface A1 between the first locking protrusion 25b and the second locking protrusion 37a being located within the up-down width of the filler 60 in the up-down direction, the expansion force or the like of the filler 60 is efficiently converted into the engagement force. As a result of the first locking protrusion 25b and the second locking protrusion 37a extending in the same direction and engaging with each other, the engagement surface A1 forms a plane extending in the same direction. This widens the area of the engagement surface A1, and further strengthens the engagement. The engagement surface A1 is approximately horizontal, which facilitates the conveyance of the engagement force between the first locking protrusion 25b and the second locking protrusion 37a. The surface of the second locking protrusion 37a in the right-left direction is in contact with the outer surface of the first locking portion 25. The contact surface A2 thus formed is approximately parallel to the inner surface 25a of the first locking portion 25 in contact with the filler 60. Hence, the expansion force or the like of the filler 60 is conveyed approximately perpendicularly to the surfaces of the first locking portion 25 and the second locking protrusion 37a in the right-left direction. The expansion force or the like of the filler 60 is therefore converted into the engagement force more efficiently.

Consequently, the state of adhesion between the first housing 20 and the second housing 30 is enhanced. Even when subjected to an elastic force from the inside to the outside, the connector 10 can suppress opening of the first housing 20 and the second housing 30. This effect is seen at normal temperatures but is more noticeable at high temperatures at which the expansion of the filler 60 is greater.

In the case where the filler 60 also has high viscosity, opening of the first housing 20 and the second housing 30 can be further suppressed. For example, as a result of the filler 60 being located inside the first housing 20 and the second housing 30, the respective fillers 60 stick to each other in the fitting state. This sticking force serves as resistance against opening of the first housing 20 and the second housing 30 when fitted to each other.

The part of the through hole 38 located inward from the first locking portion 25 in the right-left direction, the space between the protrusions 31d and 31e and the filler 60, and the recess 27 form a space V into which an excess of the filler 60 enters. Hence, an excess of the filler 60 can be absorbed and stored. This suppresses variations due to individual differences with regard to the pressing force of the filler 60 on the first cable 71 and the second cable 72.

The filler 60 adheres to the first facing surface 20c and the second facing surface 30c and encloses the relay contact 50. The first filler 61 and the second filler 62 crush each other and are in a one-time compressed state so as to reliably adhere to each other. In the case where the filler 60 is made of a material having cementing properties, the first filler 61 and the second filler 62 are integrated by a chemical reaction such as hydrogen bonding. For example, even if the first housing 20 and the second housing 30 are separated in the up-down direction, the first filler 61 and the second filler 62 which have been cemented once do not separate from each other. The cemented first filler 61 and second filler 62 do not have an interface, unlike in the case where materials having sticking properties such as a typical silicone gel are joined to each other. Therefore, interface peeling caused by a dynamic action, heat expansion, or the like does not occur, and the bonding power increases significantly. The cemented first filler 61 and second filler 62 keep providing a seal surrounding the relay contact 50 while extending integrally, even if the first housing 20 and the second housing 30 are separated in the up-down direction. In the case where the filler 60 has elasticity in addition to cementing properties, the filler 60 expands and contracts to some extent due to, for example, vibration of the connector 10. Even in such a case, the cemented first filler 61 and second filler 62 expand and contract uniformly in a state of being integrated with each other. The distribution of stress acting on the cemented first filler 61 and second filler 62 is approximately uniform throughout.

The first filler 61 and the second filler 62 need to be overlapped with each other by a predetermined thickness in the up-down direction, in order to achieve the foregoing compressed state. With reference to FIG. 10, an end surface S1 of the first filler 61 is located on the second filler 62 side of a center line P of the cemented filler 60 in the up-down direction, in the case where the compressed state by the adhesion to the second filler 62 is not assumed. Likewise, an end surface S2 of the second filler 62 is located on the first filler 61 side of the center line P, in the case where the compressed state by the adhesion to the first filler 61 is not assumed.

The pressing portions 26 and 39 respectively press the first filler 61 and the second filler 62 toward the other housing. The pressing portions 26 and 39 press the filler 60 so that the respective fillers 60 adhere to each other in conformity with the shapes of the first cable 71 and the second cable 72. More specifically, the pressing portions are arranged so as to sandwich each cable in the right-left direction, and press the filler 60 toward the right and left ends of the cable. In this way, the difference in surface pressure of each filler due to the difference in shape between the first housing 20 and the second housing 30 is adjusted. This improves the cementing properties between the first filler 61 and the second filler 62 around the first cable 71 and the second cable 72.

As described above, the connector 10 can isolate the connection portion between each of the first cable 71 and the second cable 72 and the relay contact 50 from the outside by the housing 15 and the filler 60, thus providing the foregoing protection functions for the connection portion.

Figure 11:
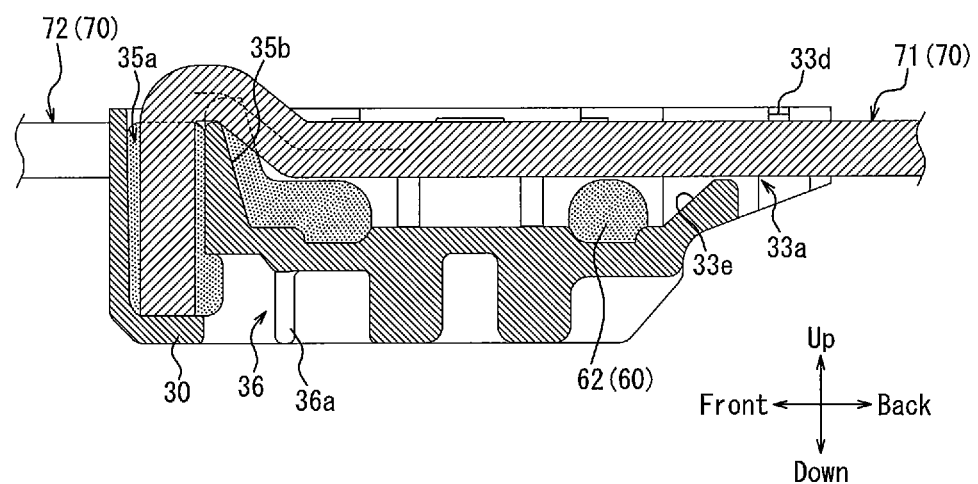
FIG. 11 is a sectional view along arrow XI-XI in FIG. 8D.
Figure 12:
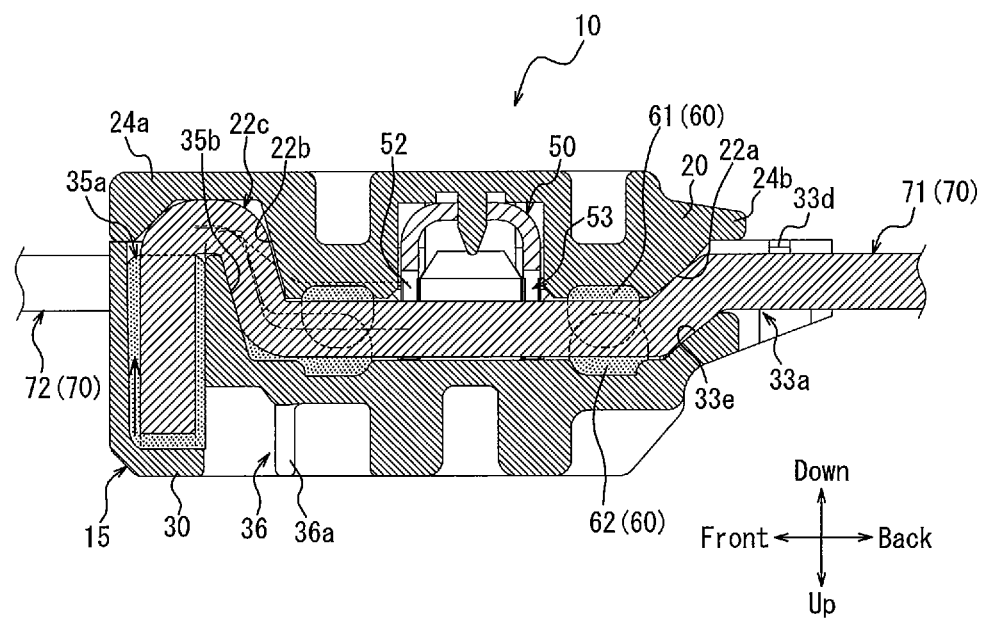
FIG. 12 is a sectional view along arrow XII-XII in FIG. 1.

FIG. 11 is a sectional view along arrow XI-XI in FIG. 8D. FIG. 12 is a sectional view along arrow XII-XII in FIG. 1. The state of the first cable 71 will be mainly described below while comparing a pre-fitting state in which the connector 10 provisionally holds the object 70 and a fitting state in which the connector 10 holds the object 70, with reference to FIGS. 11 and 12. In FIG. 12, the connector 10 in the fitting state is turned upside down from the state in FIG. 1 to correspond to the orientation of the second housing 30 in FIG. 11, for the sake of convenience.

With reference to FIG. 11, the first cable 71 in a state of being provisionally held by the connector 10 extends from the accommodating portion 35a, bends obliquely downward, and linearly extends backward. The accommodating portion 35a is a recess that is recessed in a direction different from the extending direction of the first cable 71, i.e. the front-back direction. For example, the recessing direction of the accommodating portion 35a is approximately orthogonal to the extending direction of the first cable 71. The end of the first cable 71 is in contact with or close to the bottom surface of the accommodating portion 35a. The end of the first cable 71 is covered with the bottom surface of the accommodating portion 35a or the filler 60, in the accommodating portion 35a. As a result of the filler 60 being pressed by the insertion of the first cable 71, part of the filler 60 with which the accommodating portion 35a is loaded moves from the opening at the upper part or the bottom of the accommodating portion 35a toward the inside of the second housing 30 or the receiving portion 36.

With reference to FIG. 12, as a result of the first cable 71 being pushed in to an approximately central part of the first press-contact groove 53 in the fitting state in which the first housing 20 and the second housing 30 are fitted to each other, the inclination of the first cable 71 becomes steeper. The length of the part of the first cable 71 extending from the vicinity of the upper end of the accommodating portion 35a to the accommodating position of the first cable press-contact piece 52 on the front side is longer than that before the fitting, as indicated respectively by a dashed line and a dashed-two dotted line in FIGS. 11 and 12. Accordingly, the position of the end of the first cable 71 in the accommodating portion 35a shifts to the fitting side. The first cable 71 is sandwiched between the first wall portion 22b and the second wall portion 35b. More specifically, the first cable 71 is located between the first wall portion 22b and the second wall portion 35b, with its surface being in contact with or close to the surfaces of the first wall portion 22b and the second wall portion 35b. As compared with the pre-fitting state, the position of the end of the first cable 71 shifts to the fitting side and the first cable 71 approaches the second wall portion 35b, so that part of the filler 60 located near the accommodating portion 35a returns into the accommodating portion 35a. Thus, even when the position of the end of the first cable 71 shifts to the fitting side, the filler 60 covers the end of the first cable 71 in the accommodating portion 35a.

In the state in which the first housing 20 and the second housing 30 are fitted to each other and held, the lid portions 24a and 24b of the first housing 20 block the first cable holding groove 33a, the second cable holding groove 34a, and the opening on the fitting side of the accommodating portion 35a. Here, the first cable 71, in a state of being held in the housing 15, extends from the accommodating portion 35a and bends, and extends obliquely along the first wall portion 22b and the second wall portion 35b. The bend part of the first cable 71 is received by the receiving portion 22c recessed in the lid portion 24a. The intermediate part of the first cable 71 linearly extends in the front-back direction. The back part of the first cable 71 is located between the slope 33e of the first cable holding groove 33a and the slope 22a of the first housing 20, in a state of being inserted and held in the first cable holding groove 33a. The first cable 71 extends from the first cable holding groove 33a backward to the outside of the connector 10.

The second cable 72 arranged side by side with the first cable 71 in the right-left direction is inserted and held in the pair of second cable holding grooves 34a, in the same manner as the back part of the first cable 71. The second cable 72 is located between the pair of slopes 34e and the pair of slopes 23a. The second cable 72 has its intermediate part linearly extending in the connector 10. The second cable 72 bends on the front and back sides in the connector 10. The second cable 72 extends from the pair of second cable holding grooves 34a forward and backward to the outside of the connector 10.

Figure 13:
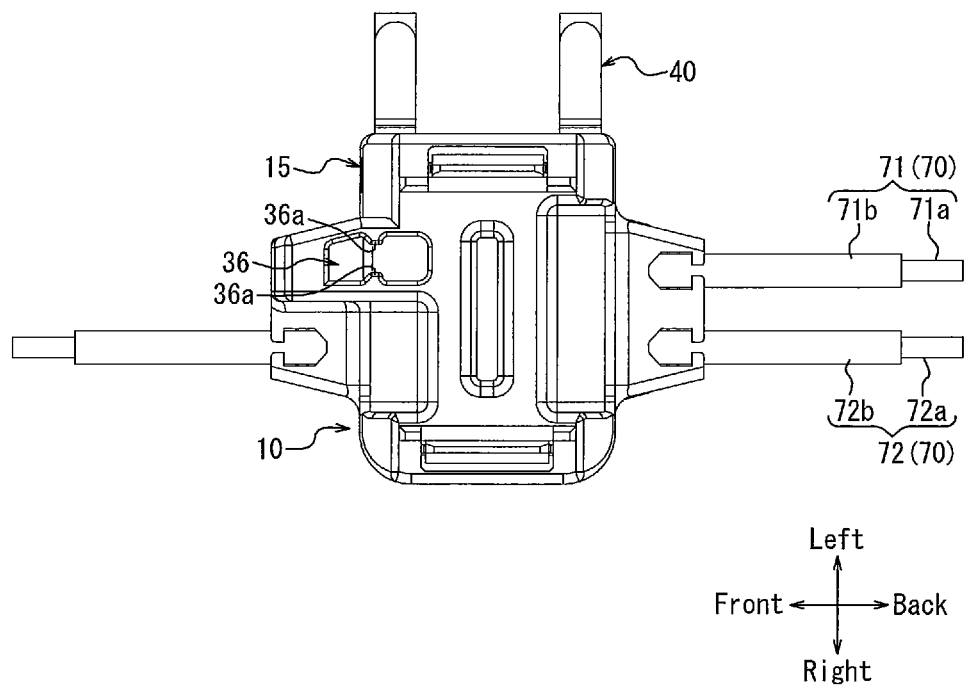
FIG. 13 is a top view of the connector in FIG. 1.

FIG. 13 is a top view of the connector 10 in FIG. 1. The functions of receiving portion 36 and the braking portion 36a for an excess of the filler 60 in a state in which the first cable 71 is attached, a fitting state, or a use state will be mainly described below, with reference to FIG. 13.

When the filler 60 with which the accommodating portion 35a is loaded is pressed in a state in which the first cable 71 is attached, a fitting state, or a use state, an excess of the filler 60 that cannot be accommodated in the accommodating portion 35a moves to the receiving portion 36. The receiving portion 36 receives the excess of the filler 60 extruded from the accommodating portion 35a. The front half part of the receiving portion 36 gradually widens backward from the accommodating portion 35a side, so that the filler 60 which has moved to the receiving portion 36 diffuses in the receiving portion 36 by the pressing force of the foregoing press. When the filler 60 diffused in the front half part of the receiving portion 36 comes into contact with the braking portion 36a, the diffusion is prevented. The braking portion 36a regulates the diffusion of the filler 60 in the receiving portion 36. Here, if the pressing force still acts on the filler 60, part of the filler 60 moves to the back half part of the receiving portion 36 beyond the braking portion 36a. Meanwhile, the rest of the filler 60 stays near the braking portion 36a in a compressed state. In such a state, for example when the position of the end of the first cable 71 shifts to the fitting side and the pressing force disappears or diminishes as mentioned above, the filler 60 in the receiving portion 36 returns into the accommodating portion 35a by the elastic force of the filler 60 in the compressed state, Since the receiving portion 36 is exposed to the outside, the filler 60 which has moved to the receiving portion 36 from the accommodating portion 35a is visible to the assembly operator or the like. The color of the housing 15 may be the same as the color of the filler 60, or different from the color of the filler 60 to ease visual observation.

The connector 10 according to this embodiment described above achieves protection treatment for the end of the object 70 with good workability, and improves long-term reliability for protection. More specifically, in the expanded state or the fitting state of the first housing 20 and the second housing 30, the filler 60 covers the end of the object 70 in the accommodating portion 35a, so that the end is isolated from the outside. Thus, the connector 10 can achieve protection treatment such as waterproofing, dustproofing, insulation, and rustproofing for the end. Moreover, as a result of the accommodating portion 35a being formed to apply the protection treatment, the assembly operator or the like does not need to use other components such as insulating tape or a waterproof cap. For such a connector 10, component count and man-hour are reduced, and workability is improved. Even in a location where operation is difficult, variations in the accuracy of the attachment operation are suppressed. Consequently, variations in long-term reliability are suppressed. The assembly operator or the like need not use a special tool, and can easily perform the attachment operation using a general tool.

In the fitting state, the object 70 extends from the accommodating portion 35a recessed in a direction different from the extending direction of the object 70 and bends. This enhances the tolerance to a tensile force acting on the object 70. More specifically, even when a backward tensile force acts on the object 70, the position of the object 70 in the backward direction is regulated because the part of the object 70 on the tip side of the bend part is accommodated in the accommodating portion 35a recessed in a direction different from the backward direction. The accommodating portion 35a thus functions as a retainer by applying resistance to a force which attempts to separate the object 70 from the connector 10 and preventing the object 70 from coming out easily. Even in the provisionally holding stage before the fitting, the accommodating portion 35a keeps the object 70 from being misaligned in the extending direction, i.e. the backward direction, so that the provisional holding of the object 70 and the adhesion of the filler 60 to the object 70 are improved.

As a result of the recessing direction of the accommodating portion 35a being approximately orthogonal to the extending direction of the object 70, the foregoing retention function for the object 70 is further enhanced, and the provisional holding of the object 70 and the adhesion of the filler 60 to the object 70 are further improved.

As a result of the housing 15 including the second wall portion 35b adjacent to the accommodating portion 35a, variations in the bending position of the object 70 between before the fitting and after the fitting can be suppressed. Since the bending position and overall position of the object 70 are stabilized, the connector 10 can further enhance the retention function for the object 70 and the effect regarding the provisional holding of the object 70 and the adhesion of the filler 60 to the object 70.

As a result of the object 70 being located between the first wall portion 22b and the second wall portion 35b in the fitting state, variations in the bending position of the object 70 are further suppressed, and the holding position of the object 70 in the housing 15 is stabilized. Accordingly, the position of the end of the object 70 in the accommodating portion 35a is regulated more stably. Consequently, the connector 10 can achieve protection treatment for the end of the object 70 more effectively.

The connector 10 can achieve stable protection effect by suppressing influence of variations in operation. More specifically, as a result of the housing 15 including the receiving portion 36, an excess of the filler 60 moves from the accommodating portion 35a, so that the connector 10 can suppress imperfect provisional holding and holding of the object 70 caused by an excessive repulsive force of the filler 60. Moreover, the connector 10 can suppress hindrance of fitting by an excess of the filler 60 and opening between the first housing 20 and the second housing 30 after the fitting. The connector 10 can thus provide stable protection functions regardless of variations in operation by the assembly operator or the like.

As a result of the receiving portion 36 including the braking portion 36a, the flow of the filler 60 from the accommodating portion 35a to the receiving portion 36 is subjected to resistance. The filler 60 is therefore prevented from flowing out excessively. In addition, in the case where the amount of the filler 60 in the accommodating portion 35a decreases or becomes insufficient to achieve appropriate protection functions as a result of the position of the end of the object 70 shifting in the accommodating portion 35a or the filler 60 moving in the fitting state, an excess of the filler 60 returns into the accommodating portion 35a. The connector 10 can thus provide protection functions for the end of the object 70 more reliably.

As a result of the braking portion 36a being a protrusion portion that protrudes from the surface of the receiving portion 36 in a direction approximately orthogonal to the moving direction of the filler 60, the connector 10 can achieve the foregoing effect relating to the braking portion 36a more remarkably.

As a result of the receiving portion 36 being a recess exposed to the outside, the assembly operator or the like can visually determine an excess of the filler 60. Hence, the assembly operator or the like can visually determine proper insertion of the object 70 and completion of fitting of the housing 15 based on an excess of the filler 60 exposed to the outside.

As a result of the color of the housing 15 being different from the color of the filler 60, the visibility of an excess of the filler 60 is further improved. The connector 10 can therefore achieve the foregoing effect relating to the receiving portion 36 exposed to the outside more remarkably. This improves the operating accuracy and yield on site by the assembly operator or the like.

It is to be understood by a person of ordinary skill in the art that the disclosed technique may also be realized in specific forms other than the foregoing embodiments without departing from the technical spirit or essential features of the present disclosure. Therefore, the above description is illustrative and not restrictive. The scope of the present disclosure is defined by the accompanying claims rather than by the above description. Amongst all modifications, those falling within the corresponding equivalent scope are encompassed within the scope of the present disclosure.

For example, the shape, position, and number of each component described above are not limited to those in the above description and the illustration in the drawings. The shape, position, and number of each component may be freely set as long as its functions can be achieved. The method of attaching the connector 10 to the object 70 is not limited to that in the above description. The method of attaching the connector 10 to the object 70 may be any method with which the connector 10 can be attached to the object 70 so as to achieve its functions. For example, the connector 10 may not include the connection portion 40 as long as fittability can be maintained. In this case, for example, the second housing 30 separate from the first housing 20 may be fitted to the first housing 20 downward from above.

Although the above describes the case where the housing 15 holds the object 70 in a state in which the object 70 extends from the accommodating portion 35a recessed in a direction different from the extending direction of the object 70 and bends, the method of holding the object 70 by the housing 15 and the recessing direction of the accommodating portion 35a are not limited to such. The holding method and the recessing direction may be any method and direction as long as the filler 60 covers the end of the object 70 in the accommodating portion 35a. For example, the housing 15 may hold the object 70 without bending the object 70. For example, the accommodating portion 35a may be a recess that is recessed in the same direction as the extending direction of the object 70.

Although the above describes the case where the accommodating portion 35a is a recess that is approximately rectangular in a top view, the shape of the accommodating portion 35a is not limited to such. The accommodating portion 35a may be a recess of a mortar shape. Such an accommodating portion 35a can appropriately accommodate objects 70 of different diameters. This enhances the versatility of the connector 10.

Figure 14:
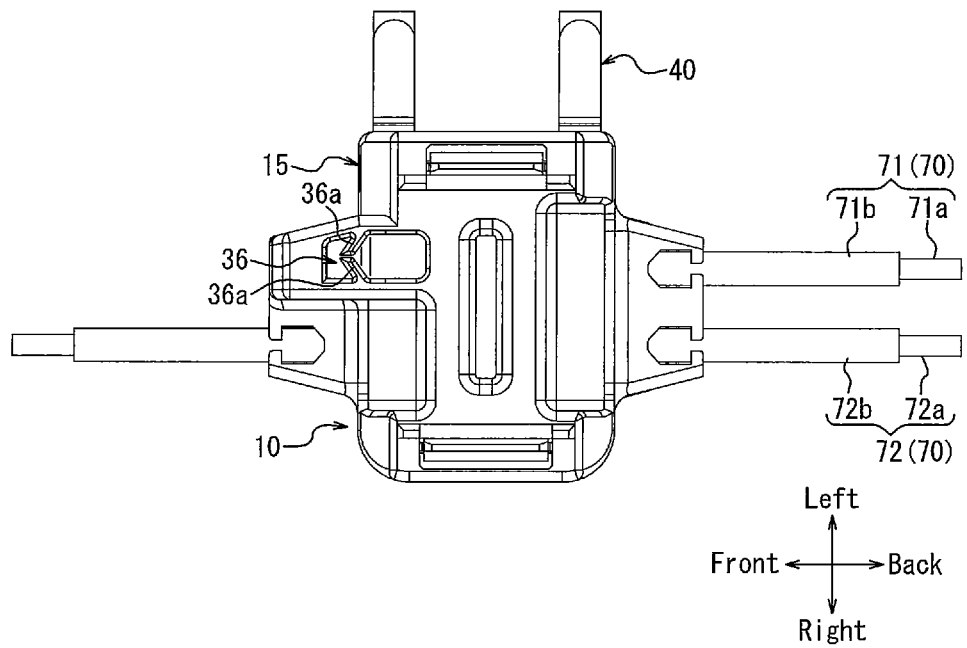
FIG. 14 is a top view of a connector according to a first modification.
Figure 15:
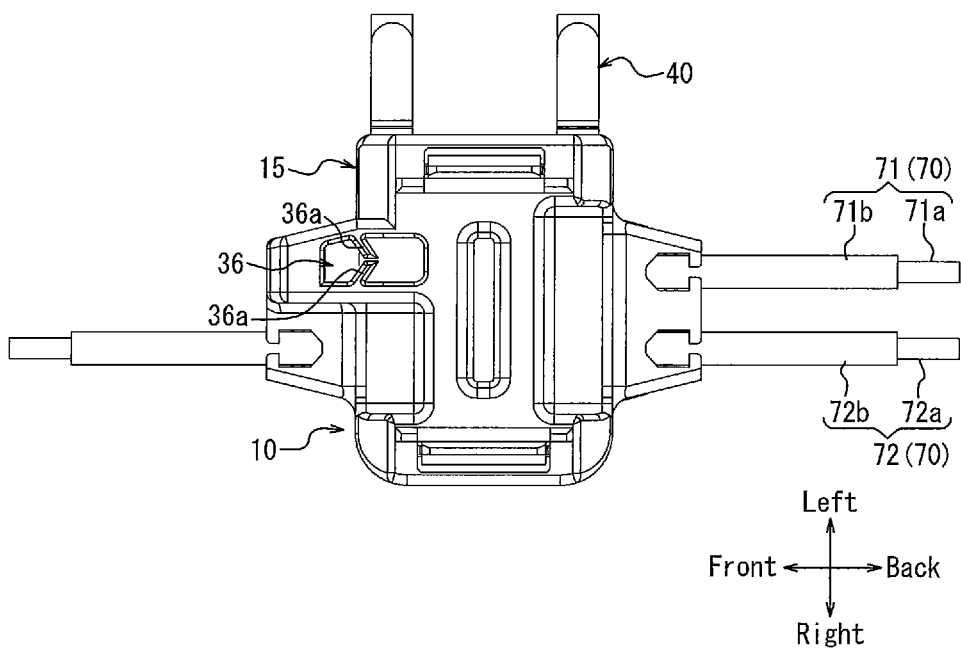
FIG. 15 is a top view of a connector according to a second modification.

FIG. 14 is a top view of a connector 10 according to a first modification. FIG. 15 is a top view of a connector 10 according to a second modification. Although the above describes the case where the braking portion 36a is a protrusion portion that protrudes from the surface of the receiving portion 36 in the right-left direction, the shape of the braking portion 36a is not limited to such. The shape of the braking portion 36a may be any shape as long as the diffusion of the filler 60 can be regulated. For example, a pair of right and left protrusions forming the braking portion 36a may have an inverse tapered shape that is obliquely inclined toward the inside of the receiving portion 36 in the forward direction, as illustrated in FIG. 14. The right-left spacing between the pair of protrusions may gradually narrow in the forward direction. Alternatively, a pair of right and left protrusions forming the braking portion 36a may have a tapered shape that is obliquely inclined toward the inside of the receiving portion 36 in the backward direction, as illustrated in FIG. 15.

Figure 16:
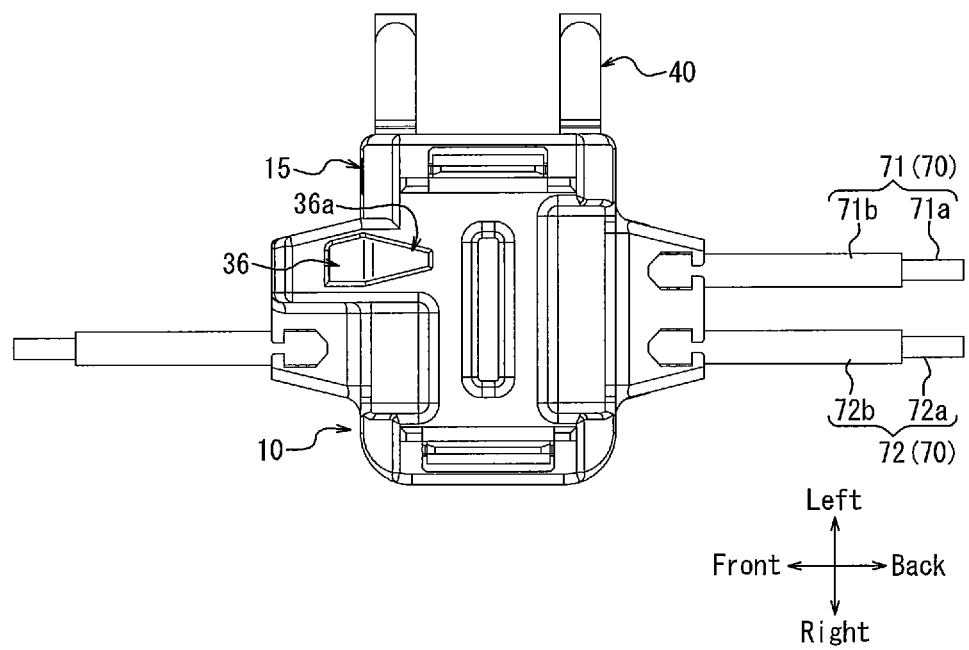
FIG. 16 is a top view of a connector according to a third modification.
Figure 17:
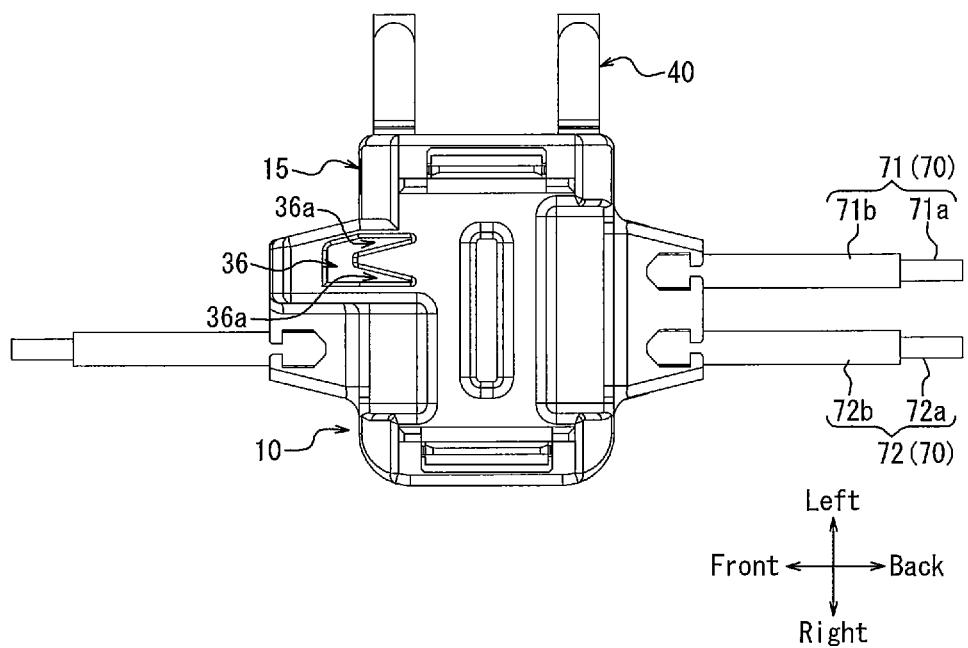
FIG. 17 is a top view of a connector according to a fourth modification.

FIG. 16 is a top view of a connector 10 according to a third modification. FIG. 17 is a top view of a connector 10 according to a fourth modification. Although the above describes the case where the receiving portion 36 has the protrusion-shaped braking portion 36a, the receiving portion 36 is not limited to such. The receiving portion 36 may not include a protrusion portion. In such a case, the braking portion 36a may be a part in the receiving portion 36 where the width in a direction approximately orthogonal to the moving direction of the filler 60 narrows in the moving direction. For example, the braking portion 36a may be a taper portion in which the width of the receiving portion 36 in a direction approximately orthogonal to the moving direction of the filler 60 gradually narrows toward the side opposite to the accommodating portion 35a. For example, the braking portion 36a may be a taper portion that is formed in the back half part of the receiving portion 36 and in which the right-left width of the whole receiving portion 36 gradually narrows in the backward direction, as illustrated in FIG. 16. For example, the braking portion 36a may be two taper portions in which the spacing between each of the right and left surfaces of a protrusion of an inverse tapered shape formed in the back half part of the receiving portion 36 and the corresponding one of the right and left inner surfaces of the receiving portion 36 gradually narrows in the backward direction, as illustrated in FIG. 17.

Although the above describes the case where the receiving portion 36 is a recess exposed to the outside, the receiving portion 36 is not limited to such. The receiving portion 36 may be formed inside the housing 15 as long as it can receive an excess of the filler 60 extruded from the accommodating portion 35a.

Although the engagement surface A1 between the first locking protrusion 25b and the second locking protrusion 37a is an approximately horizontal plane extending in the front-back direction in FIG. 9, the shape of the engagement surface A1 is not limited to such. For example, the engagement surface A1 may be inclined downward from the inside toward the outside of the fitted first housing 20 and second housing 30. With such a cross-sectional shape, the engagement force is enhanced, and the possibility of unlocking of the first locking protrusion 25b and the second locking protrusion 37a is further reduced.

Although the above describes the case where the first locking portion 25 is formed in the first housing 20 and the second locking portion 37 is formed in the second housing 30, the first locking portion 25 and the second locking portion 37 are not limited to such. The first locking portion 25 having elasticity may be formed in the second housing 30 not including the relay contact 50, and the second locking portion 37 may be formed in the first housing 20 including the relay contact 50. The formation positions of the first locking portion 25 and the second locking portion 37 in the first housing 20 and the second housing 30 are not limited to the positions described above. The formation positions may be any positions with which the first housing 20 and the second housing 30 are fitted and held in a locked state.

Although the above describes the case where the first locking portion 25 and the second locking portion 37 respectively have the first locking protrusion 25b and the second locking protrusion 37a and the first locking protrusion 25b and the second locking protrusion 37a engage with each other, the locking means is not limited to such. The first locking portion 25 and the second locking portion 37 may have any locking means.

Although the above describes the case where the first housing 20 and the second housing 30 are respectively loaded with the first filler 61 and the second filler 62, the disclosed technique is not limited to such. Only one of the first housing 20 and the second housing 30 may be loaded with the filler 60 as long as appropriate protection functions can be achieved.

REFERENCE SIGNS LIST 10 connector
15 housing
20 first housing (fitting body)
20a outer peripheral wall
20b first recess
20c first facing surface
20d central recess
20e central facing surface
21 contact mounting groove
21a intermediate projection
21b protruding portion
21c positioning protrusion
22 first cable mounting groove
22a slope
22b first wall portion (wall portion)
22c receiving portion
23 second cable mounting groove
23a slope
24a lid portion
24b lid portion
25 first locking portion
25a inner surface
25b first locking protrusion
25c slope
25d slope
25e notch
26 pressing portion
27 recess
30 second housing (fitting body)
30a outer peripheral wall
30b second recess
30c second facing surface
31 cable pressing protrusion
31a first pressing groove
31b second pressing groove
31c central protrusion
31d protrusion
31e protrusion
32a cable support arm portion
32b cable support arm portion
33a first cable holding groove
33b protrusion piece
33c claw portion
33d anti-dropout protrusion
33e slope
34a second cable holding groove
34b protrusion piece
34c claw portion
34d anti-dropout protrusion
34e slope
35a accommodating portion
35b second wall portion (wall portion)
36 receiving portion
36a braking portion
37 second locking portion
37a second locking protrusion
37b slope
37c protrusion wall
38 through hole
39 pressing portion
40 connection portion
41 first connection portion
42 second connection portion
43 bendable portion
50 relay contact
51 base piece
51a positioning hole
51b play portion
52 first cable press-contact piece
52a tip
52b narrow portion
53 first press-contact groove
54 second cable press-contact piece
54a tip
54b narrow portion
55 second press-contact groove
60 filler
61 first filler
62 second filler
70 object
71 first cable
71a core wire
71b sheath
72 second cable
72a core wire
72b sheath
A1 engagement surface
A2 contact surface
P center line
S1 end surface
S2 end surface
V space

The invention claimed is:

1. A connector configured to bring an object into conduction, the connector comprising:
a pair of fitting bodies comprising a first housing and a second housing fittable to each other; and
a filler with which said first housing and said second housing are loaded,
wherein said second housing includes:
an accommodating portion formed inside said second housing, including a bottom surface, and configured to surround said object together with said filler, said bottom surface of said accommodating portion facing an end surface in an extending direction of said object; and a receiving portion in an outer surface of the second housing and adjacent to said accommodating portion is in communication with the accommodating portion through an opening therebetween such that at least a portion of said filler in the accommodating portion may move to the receiving portion.

2. The connector according to claim 1,
wherein said accommodating portion accommodates an end of said object.

3. The connector according to claim 1,
wherein a color of said second housing is different from a color of said filler.

4. The connector according to claim 1, wherein said recess receives an excess of said filler that has moved from said accommodating portion to said recess and becomes visible from an outside of said connector with said object inserted in said accommodating portion.

5. The connector according to claim 1,
wherein said second housing includes a braking portion configured to be formed in said receiving portion and prevent said filler from moving to a side opposite to said accommodating portion in said receiving portion.

6. The connector according to claim 5,
wherein said braking portion is a protrusion portion protruding from a surface of said receiving portion in a direction approximately orthogonal to a moving direction of said filler.

7. The connector according to claim 5,
wherein said braking portion is a part in said receiving portion where a width in a direction approximately orthogonal to a moving direction of said filler narrows in said moving direction.

\* \* \* \* \*